US012688565B2

(12) United States Patent
Chen et al.

(10) Patent No.: US 12,688,565 B2
(45) Date of Patent: Jul. 21, 2026

(54) SYSTEMS METHODS AND COMPUTER PROGRAM PRODUCTS FOR SELECTIVELY MODIFYING X-RAY IMAGES OF TISSUE SPECIMENS

(71) Applicant: HOLOGIC, INC., Marlborough, MA (US)

(72) Inventors: Biao Chen, Newark, DE (US);
Kenneth F. Defreitas, Patterson, NY (US); Shawn Hochstetler, Sandy Hook, CT (US)

(73) Assignee: Hologic, Inc., Marlborough, MA (US)

( * ) Notice: Subject to any disclaimer, the term of this patent is extended or adjusted under 35 U.S.C. 154(b) by 414 days.

(21) Appl. No.: 17/910,726

(22) PCT Filed: Apr. 12, 2021

(86) PCT No.: PCT/US2021/026877

§ 371 (c)(1),
(2) Date: Sep. 9, 2022

(87) PCT Pub. No.: WO2021/221893

PCT Pub. Date: Nov. 4, 2021

(65) Prior Publication Data

US 2023/0136395 A1 May 4, 2023

Related U.S. Application Data

(60) Provisional application No. 63/018,372, filed on Apr. 30, 2020.

(51) Int. Cl.
| | |
|---|---|
| *G06T 5/00* | (2024.01) |
| *G06T 5/90* | (2024.01) |
| *G06T 7/11* | (2017.01) |

(52) U.S. Cl.
CPC . *G06T 5/90* (2024.01); *G06T 7/11* (2017.01)

(58) Field of Classification Search
CPC ... G06T 5/90; G06T 7/11; G06T 2207/10116; G06T 2207/30024; G06T 7/174
See application file for complete search history.

(56) References Cited

U.S. PATENT DOCUMENTS

| | | | |
|---|---|---|---|
| 2,302,698 | A | 11/1942 | Kessel |
| 4,038,988 | A | 8/1977 | Perisse |
| | | (Continued) | |

FOREIGN PATENT DOCUMENTS

| | | | |
|---|---|---|---|
| CN | 104583754 A | 4/2015 | |
| CN | 204489169 U | 7/2015 | |
| | (Continued) | | |

OTHER PUBLICATIONS

Basak Erguvan-Dogan et al., "Specimen Radiography in Confirmation of MRI-Guided Needle Localization and Surgical Excision of Breast Lesions", American Journal of Roentgenology, American Roentgen Ray Society, vol. 187, No. 2: 339-344 (2006).

(Continued)

*Primary Examiner* — Stephen S Hong
*Assistant Examiner* — Carl E Barnes, Jr.
(74) *Attorney, Agent, or Firm* — Merchant & Gould P.C.

(57) ABSTRACT

X-ray images generated by a biopsy tissue handling apparatus are selectively modified to emphasize areas of interest and deemphasize or eliminate image areas that are distracting, impair view attention and/or contribute to eye fatigue, An image processor executes image masks based on a geometric configuration of a portion of a specimen tray including a storage compartment with tissue specimen, A compartment mask executes on a portion of X-ray image depicting storage compartment including tissue specimen. Compartment mask boundary substantially corresponds to a contour of compartment. Partial structure mask executes on a portion of X-ray image depicting respective walls of (Continued)

specimen tray and storage compartment. Partial structure mask boundary extends along respective lengths and partially through respective walls of specimen tray.

21 Claims, 20 Drawing Sheets

(56) References Cited

U.S. PATENT DOCUMENTS

| | | | |
|---|---|---|---|
| 4,134,012 A | 1/1979 | Smallbone et al. |
| 4,306,570 A | 12/1981 | Matthews |
| 4,549,554 A | 10/1985 | Markham |
| 4,658,834 A | 4/1987 | Blankenship et al. |
| 4,802,195 A | 1/1989 | Wojciechowski |
| 4,803,639 A | 2/1989 | Steele |
| 4,837,795 A | 6/1989 | Garrigus |
| 4,852,560 A | 8/1989 | Hermann, Jr. |
| 5,023,894 A | 6/1991 | Yamashita |
| 5,023,895 A | 6/1991 | McCroskey |
| 5,256,160 A | 10/1993 | Clement |
| 5,427,742 A | 6/1995 | Holland |
| 5,456,689 A | 10/1995 | Kresch et al. |
| 5,491,344 A | 2/1996 | Kenny et al. |
| 5,505,210 A | 4/1996 | Clement |
| 5,526,822 A | 6/1996 | Burbank et al. |
| 5,541,856 A | 7/1996 | Hammermeister |
| 5,575,293 A | 11/1996 | Miller et al. |
| 5,609,827 A | 3/1997 | Russell et al. |
| 5,754,621 A | 5/1998 | Suzuki |
| 5,983,125 A | 11/1999 | Alfano et al. |
| 6,017,316 A | 1/2000 | Ritchart et al. |
| 6,032,673 A | 3/2000 | Savage et al. |
| 6,058,159 A | 5/2000 | Conway |
| 6,163,590 A | 12/2000 | Wilkins |
| 6,207,111 B1 | 3/2001 | Weinberg |
| 6,225,107 B1 | 5/2001 | Nagle |
| 6,234,672 B1 | 5/2001 | Tomasetti et al. |
| 6,322,522 B1 | 11/2001 | Zimmon |
| 6,403,035 B1 | 6/2002 | Caratsch et al. |
| 6,485,436 B1 | 11/2002 | Truckai et al. |
| 6,535,284 B1 | 3/2003 | Hajduk et al. |
| 6,646,721 B2 | 11/2003 | Compter |
| 6,899,850 B2 | 5/2005 | Haywood |
| 7,166,113 B2 | 1/2007 | Arambula |
| 7,175,612 B2 | 2/2007 | Felix et al. |
| 7,397,894 B2 | 7/2008 | Nakai |
| 7,546,925 B1 | 6/2009 | Zuk, Jr. |
| 7,616,801 B2 | 11/2009 | Gkanatsios et al. |
| 7,662,109 B2 | 2/2010 | Hibner |
| 7,692,144 B2 | 4/2010 | Watanabe |
| 7,715,523 B2 | 5/2010 | Lafferty |
| 7,753,857 B2 | 7/2010 | Hibner |
| 7,758,601 B2 | 7/2010 | Heywang-Koebrunner et al. |
| 7,826,588 B2 | 11/2010 | Eliasson |
| 7,854,705 B2 | 12/2010 | Pawluczyk et al. |
| 7,856,081 B2 | 12/2010 | Peschmann |
| 7,858,038 B2 | 12/2010 | Andreyko et al. |
| 7,867,173 B2 | 1/2011 | Hibner et al. |
| 7,869,563 B2 | 1/2011 | DeFreitas et al. |
| 7,881,427 B2 | 2/2011 | Kalender et al. |
| 7,881,428 B2 | 2/2011 | Jing et al. |
| 7,972,062 B2 | 7/2011 | Nicolosi |
| 8,038,347 B2 | 10/2011 | Manak |
| 8,038,627 B2 | 10/2011 | Hibner |
| 8,050,735 B2 | 11/2011 | Feke |
| 8,052,616 B2 | 11/2011 | Andrisek et al. |
| 8,162,140 B2 | 4/2012 | Hansen |
| 8,177,728 B2 | 5/2012 | Hibner et al. |
| 8,213,570 B2 | 7/2012 | Panesar |
| 8,217,357 B2 | 7/2012 | Stein et al. |
| 8,235,913 B2 | 8/2012 | Hibner et al. |
| 8,284,896 B2 | 10/2012 | Singh |
| 8,532,745 B2 | 9/2013 | DeFreitas et al. |
| 8,565,374 B2 | 10/2013 | DeFreitas et al. |
| 8,702,623 B2 | 4/2014 | Parihar |
| 8,741,232 B2 | 6/2014 | Baysal |
| 8,764,679 B2 | 7/2014 | Miller et al. |
| 8,787,522 B2 | 7/2014 | Smith et al. |
| 8,838,207 B2 | 9/2014 | Nakayama et al. |
| 8,873,716 B2 | 10/2014 | Ren et al. |
| 8,911,381 B2 | 12/2014 | Hibner et al. |
| 8,923,603 B2 | 12/2014 | Weston |
| 8,956,306 B2 | 2/2015 | Hibner |
| 8,971,484 B2 | 3/2015 | Beckmann |
| 8,983,030 B2 | 3/2015 | Ookawa |
| 9,020,579 B2 | 4/2015 | Smith et al. |
| 9,066,706 B2 | 6/2015 | DeFreitas et al. |
| 9,068,920 B2 | 6/2015 | Churilla |
| 9,129,715 B2 | 9/2015 | Adler |
| 9,188,696 B2 | 11/2015 | Schafer |
| 9,234,855 B2 | 1/2016 | Watanabe |
| 9,277,895 B2 | 3/2016 | Hara |
| 9,322,790 B2 | 4/2016 | Ookawa |
| 9,326,755 B2 | 5/2016 | Fiebig |
| 9,329,139 B2 | 5/2016 | Itou |
| 9,341,546 B2 | 5/2016 | Stuke |
| 9,347,894 B2 | 5/2016 | Sims |
| 9,492,130 B2 | 11/2016 | Flagle et al. |
| 9,498,175 B2 | 11/2016 | Stein et al. |
| 9,549,709 B2 | 1/2017 | DeFreitas et al. |
| 9,642,581 B2 | 5/2017 | Lowe |
| 9,668,711 B2 | 6/2017 | Smith et al. |
| 9,733,167 B2 | 8/2017 | Wismueller |
| 9,750,484 B2 | 9/2017 | Finke et al. |
| 9,861,327 B2 | 1/2018 | Yasuda et al. |
| 9,865,424 B2 | 1/2018 | Ikeda |
| 9,901,320 B2 | 2/2018 | DeFreitas et al. |
| 9,943,850 B2 | 4/2018 | Purdy |
| 9,953,799 B2 | 4/2018 | Hakoda |
| 10,008,298 B2 | 6/2018 | King |
| 10,010,296 B2 | 7/2018 | Basu |
| 10,078,093 B2 | 9/2018 | Flagle |
| 10,098,216 B2 | 10/2018 | Kabumoto |
| 10,105,709 B2 | 10/2018 | Purdy |
| 10,145,806 B2 | 12/2018 | Tanaka |
| 10,190,997 B2 | 1/2019 | Aoki |
| 10,194,875 B2 | 2/2019 | DeFreitas et al. |
| 10,201,331 B2 | 2/2019 | Fleming |
| 10,322,412 B2 | 6/2019 | Purdy |
| 10,393,678 B2 | 8/2019 | Watanabe |
| 10,488,351 B2 | 11/2019 | Butani |
| 10,489,964 B2 | 11/2019 | Wang |
| 10,542,951 B2 | 1/2020 | Klausz et al. |
| 10,561,387 B2 | 2/2020 | Smith et al. |
| 10,631,809 B2 | 4/2020 | Noh |
| 10,705,030 B2 | 7/2020 | Watanabe |
| 10,709,396 B2 | 7/2020 | Lou |
| 10,729,403 B2 | 8/2020 | DeFreitas et al. |
| 10,753,836 B2 | 8/2020 | O'Driscoll |
| 10,792,003 B2 | 10/2020 | Smith et al. |
| 10,809,208 B2 | 10/2020 | Yashima |
| 10,827,989 B2 | 11/2020 | Vancamberg et al. |
| 10,905,385 B2 | 2/2021 | DeFreitas et al. |
| 11,083,426 B2 | 8/2021 | DeFreitas |
| 11,191,502 B2 | 12/2021 | Smith et al. |
| 11,246,551 B2* | 2/2022 | Butani .................... A61B 6/04 |
| 11,478,206 B2 | 10/2022 | Smith et al. |
| 11,617,548 B2 | 4/2023 | DeFreitas et al. |
| 2002/0007188 A1 | 1/2002 | Arambula |
| 2002/0145722 A1 | 10/2002 | Compter |
| 2002/0193656 A1 | 12/2002 | Ravins et al. |
| 2003/0087423 A1 | 5/2003 | Haywood |
| 2003/0216730 A1 | 11/2003 | Barry et al. |
| 2004/0022350 A1 | 2/2004 | Gregerson et al. |
| 2004/0174031 A1 | 9/2004 | Rasmussen |
| 2004/0218716 A1 | 11/2004 | Freifeld |
| 2005/0051723 A1 | 3/2005 | Neagle et al. |
| 2005/0065453 A1 | 3/2005 | Shabaz et al. |
| 2005/0112034 A1 | 5/2005 | McCormick |
| 2005/0124913 A1 | 6/2005 | Damarati |
| 2005/0148842 A1 | 7/2005 | Wang |
| 2006/0074343 A1 | 4/2006 | Hibner |
| 2006/0116603 A1 | 6/2006 | Shibazaki et al. |
| 2006/0173266 A1 | 8/2006 | Pawluczyk et al. |

(56)  References Cited

U.S. PATENT DOCUMENTS

| | | |
|---|---|---|
| 2007/0106176 A1 | 5/2007 | Mark et al. |
| 2007/0116612 A1 | 5/2007 | Williamson |
| 2007/0166834 A1 | 7/2007 | Williamson et al. |
| 2007/0237684 A1 | 10/2007 | Hansen |
| 2007/0239067 A1 | 10/2007 | Hibner et al. |
| 2007/0270714 A1 | 11/2007 | Cushner et al. |
| 2008/0004545 A1 | 1/2008 | Garrison |
| 2008/0082021 A1 | 4/2008 | Ichikawa |
| 2008/0132805 A1 | 6/2008 | Heywang-Koebrunner et al. |
| 2008/0137935 A1 | 6/2008 | Spahn |
| 2008/0214955 A1 | 9/2008 | Speeg et al. |
| 2008/0221480 A1 | 9/2008 | Hibner et al. |
| 2008/0228103 A1 | 9/2008 | Ritchie et al. |
| 2008/0249434 A1 | 10/2008 | Hashimshony et al. |
| 2009/0088663 A1 | 4/2009 | Miller et al. |
| 2009/0088666 A1 | 4/2009 | Miller et al. |
| 2009/0131818 A1 | 5/2009 | Speeg et al. |
| 2009/0131820 A1 | 5/2009 | Speeg |
| 2009/0131823 A1 | 5/2009 | Andreyko et al. |
| 2009/0171243 A1 | 7/2009 | Hibner et al. |
| 2009/0171244 A1 | 7/2009 | Ning |
| 2009/0213987 A1 | 8/2009 | Stein |
| 2010/0080346 A1 | 4/2010 | Kalender et al. |
| 2010/0081964 A1 | 4/2010 | Mark |
| 2010/0152611 A1 | 6/2010 | Parihar |
| 2010/0160824 A1 | 6/2010 | Parihar |
| 2010/0160826 A1 | 6/2010 | Parihar |
| 2010/0191145 A1 | 7/2010 | Lafferty |
| 2010/0317997 A1 | 12/2010 | Hibner |
| 2011/0123074 A1* | 5/2011 | Nie ..................... A61B 6/5252 |
| | | 382/128 |
| 2011/0142201 A1 | 6/2011 | Eberhard et al. |
| 2011/0285837 A1* | 11/2011 | Bello ..................... G06T 7/12 |
| | | 382/133 |
| 2012/0014504 A1 | 1/2012 | Jang et al. |
| 2012/0051514 A1 | 3/2012 | Sims et al. |
| 2012/0053484 A1 | 3/2012 | Parks |
| 2012/0065542 A1 | 3/2012 | Hibner et al. |
| 2012/0116246 A1 | 5/2012 | Hibner |
| 2012/0123295 A1 | 5/2012 | Sanbuichi |
| 2012/0245485 A1 | 9/2012 | Hibner |
| 2013/0053724 A1 | 2/2013 | Fiebig |
| 2013/0101089 A1 | 4/2013 | Cho |
| 2013/0231585 A1* | 9/2013 | Flagle ..................... G01N 35/04 |
| | | 600/565 |
| 2014/0039343 A1 | 2/2014 | Mescher |
| 2014/0051986 A1 | 2/2014 | Zhao et al. |
| 2014/0065656 A1 | 3/2014 | Baysal |
| 2014/0072104 A1 | 3/2014 | Jacobsen et al. |
| 2014/0198893 A1 | 7/2014 | Badawi et al. |
| 2014/0257135 A1 | 9/2014 | DeFreitas |
| 2014/0276209 A1 | 9/2014 | Hibner |
| 2015/0083893 A1 | 3/2015 | Wismueller |
| 2015/0131773 A1 | 5/2015 | Lowe et al. |
| 2015/0209017 A1 | 7/2015 | Fleming |
| 2015/0231627 A1 | 8/2015 | Sloan |
| 2016/0073988 A1 | 3/2016 | Nagai |
| 2016/0151054 A1 | 6/2016 | An |
| 2016/0211045 A1 | 7/2016 | Jeon et al. |
| 2017/0131311 A1 | 5/2017 | Flagle |
| 2017/0309063 A1 | 10/2017 | Wang |
| 2017/0336706 A1 | 11/2017 | Wang |
| 2018/0168523 A1 | 6/2018 | Vancamberg et al. |
| 2018/0249985 A1 | 9/2018 | DeFreitas et al. |
| 2019/0054217 A1 | 2/2019 | Axon |
| 2019/0072463 A1 | 3/2019 | O'Driscoll |
| 2019/0130563 A1 | 5/2019 | Vecchio et al. |
| 2019/0167869 A1 | 6/2019 | Willard |
| 2019/0195754 A1 | 6/2019 | Keller |
| 2019/0269376 A1 | 9/2019 | Butani |
| 2019/0285558 A1 | 9/2019 | DeFreitas |
| 2019/0346471 A1 | 11/2019 | Flagle |
| 2020/0029927 A1 | 1/2020 | Wilson et al. |
| 2020/0061622 A1 | 2/2020 | Purdy |
| 2020/0085393 A1 | 3/2020 | Zhang et al. |
| 2020/0160522 A1 | 5/2020 | Merlo |
| 2020/0187923 A1 | 6/2020 | Safir |
| 2020/0268331 A1 | 8/2020 | Purdy |
| 2020/0352543 A1 | 11/2020 | DeFreitas et al. |
| 2020/0386657 A1 | 12/2020 | O'Driscoll |
| 2022/0015729 A1 | 1/2022 | Purdy et al. |
| 2022/0015731 A1* | 1/2022 | Liu .......................... G06T 5/73 |
| 2022/0110597 A1* | 4/2022 | Chen ................... A61B 6/5247 |
| 2022/0133252 A1 | 5/2022 | Smith et al. |
| 2022/0331808 A1 | 10/2022 | Purdy |
| 2023/0012310 A1 | 1/2023 | Stango |
| 2023/0014922 A1 | 1/2023 | DeFreitas |
| 2023/0121010 A1 | 4/2023 | Smith et al. |
| 2023/0172572 A1 | 6/2023 | Bumdra |
| 2023/0355200 A1 | 11/2023 | Ren |
| 2024/0016461 A1 | 1/2024 | Wolff |
| 2024/0219276 A1 | 7/2024 | DeFreitas |
| 2024/0315676 A1* | 9/2024 | Chen ................. A61B 10/0096 |
| 2024/0359187 A1 | 10/2024 | Purdy |
| 2025/0166798 A1 | 5/2025 | Tripathi |

FOREIGN PATENT DOCUMENTS

| | | |
|---|---|---|
| CN | 110023994 A | 7/2019 |
| CN | 110393553 A | 11/2019 |
| DE | 20 2019 106 995 | 1/2020 |
| EP | 2277445 | 1/2011 |
| EP | 2007287 | 6/2016 |
| EP | 3143937 | 3/2017 |
| GB | 2018601 | 10/1979 |
| JP | 2006-346179 | 12/2006 |
| JP | 2014-526937 | 10/2014 |
| JP | 2015-085056 | 5/2015 |
| JP | 2015-520402 | 7/2015 |
| JP | 2016-154878 | 9/2016 |
| JP | 2017099928 | 6/2017 |
| JP | 6320717 B2 | 5/2018 |
| WO | 8101363 | 5/1981 |
| WO | 2007021905 | 2/2007 |
| WO | 2008/025146 | 3/2008 |
| WO | 2009/120206 | 10/2009 |
| WO | 2010/028208 | 3/2010 |
| WO | 2011/140374 | 11/2011 |
| WO | 2012/074885 A1 | 6/2012 |
| WO | 2013/166497 | 11/2013 |
| WO | 2017/060726 | 4/2017 |
| WO | 2018/183086 | 10/2018 |
| WO | 2018/204710 | 11/2018 |
| WO | 2019/051496 | 3/2019 |
| WO | 2019/085342 | 5/2019 |
| WO | 2019/216766 | 11/2019 |
| WO | 2020/106888 | 5/2020 |
| WO | 2021/202455 | 10/2021 |

OTHER PUBLICATIONS

International Search Report and Written Opinion of the International Searching Authority for International Patent Application No. PCT/US2021/026877 mailed Jul. 20, 2021, 11 pages.

Watanabe, M. et al., "The quantitative analysis of thin specimens: a review of progress from the Cliff-Lorimer to the new zeta-factor methods", Journal of Microscopy, 221(2): 89-109 (Feb. 2006).

PCT International Preliminary Report on Patentability in Application PCT/US2021/026877, mailed Nov. 10, 2022, 9 pages.

European Extended Search Report in Application 26160932.5, mailed May 19, 2026, 11 pages.

* cited by examiner

200

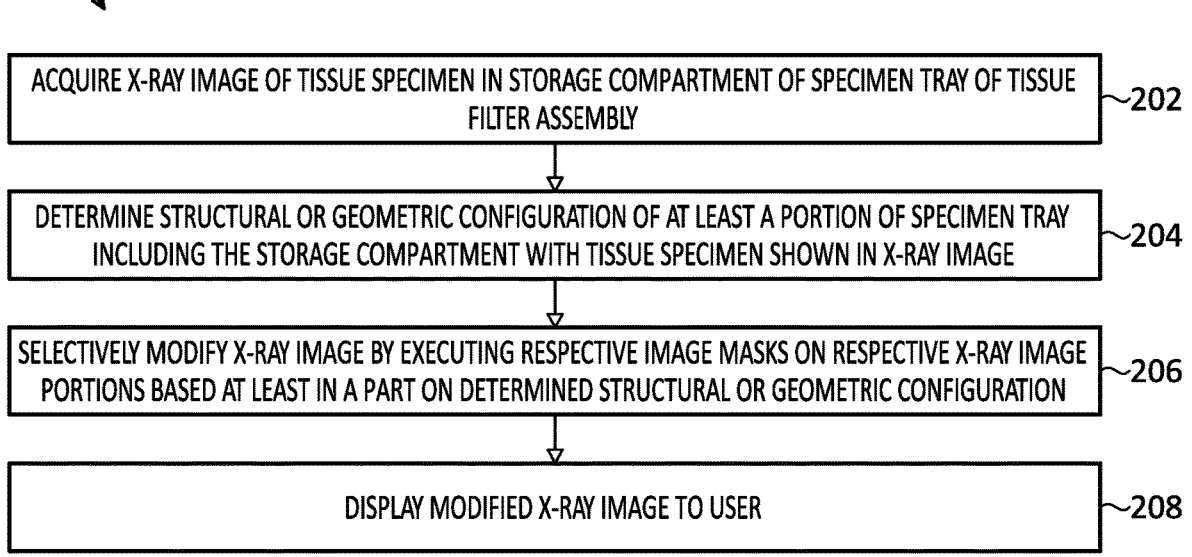

ACQUIRE X-RAY IMAGE OF TISSUE SPECIMEN IN STORAGE COMPARTMENT OF SPECIMEN TRAY OF TISSUE FILTER ASSEMBLY ~202

DETERMINE STRUCTURAL OR GEOMETRIC CONFIGURATION OF AT LEAST A PORTION OF SPECIMEN TRAY INCLUDING THE STORAGE COMPARTMENT WITH TISSUE SPECIMEN SHOWN IN X-RAY IMAGE ~204

SELECTIVELY MODIFY X-RAY IMAGE BY EXECUTING RESPECTIVE IMAGE MASKS ON RESPECTIVE X-RAY IMAGE PORTIONS BASED AT LEAST IN A PART ON DETERMINED STRUCTURAL OR GEOMETRIC CONFIGURATION ~206

DISPLAY MODIFIED X-RAY IMAGE TO USER ~208

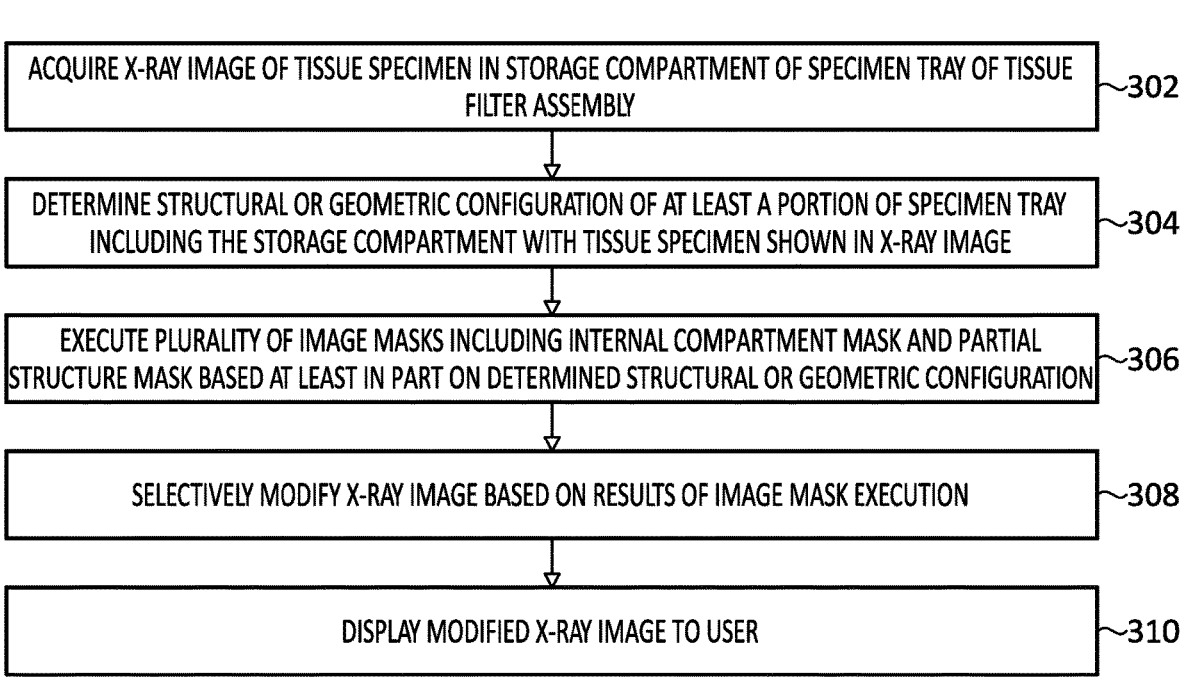

ACQUIRE X-RAY IMAGE OF TISSUE SPECIMEN IN STORAGE COMPARTMENT OF SPECIMEN TRAY OF TISSUE FILTER ASSEMBLY ~302

DETERMINE STRUCTURAL OR GEOMETRIC CONFIGURATION OF AT LEAST A PORTION OF SPECIMEN TRAY INCLUDING THE STORAGE COMPARTMENT WITH TISSUE SPECIMEN SHOWN IN X-RAY IMAGE ~304

EXECUTE PLURALITY OF IMAGE MASKS INCLUDING INTERNAL COMPARTMENT MASK AND PARTIAL STRUCTURE MASK BASED AT LEAST IN PART ON DETERMINED STRUCTURAL OR GEOMETRIC CONFIGURATION ~306

SELECTIVELY MODIFY X-RAY IMAGE BASED ON RESULTS OF IMAGE MASK EXECUTION ~308

DISPLAY MODIFIED X-RAY IMAGE TO USER ~310

FIG. 3

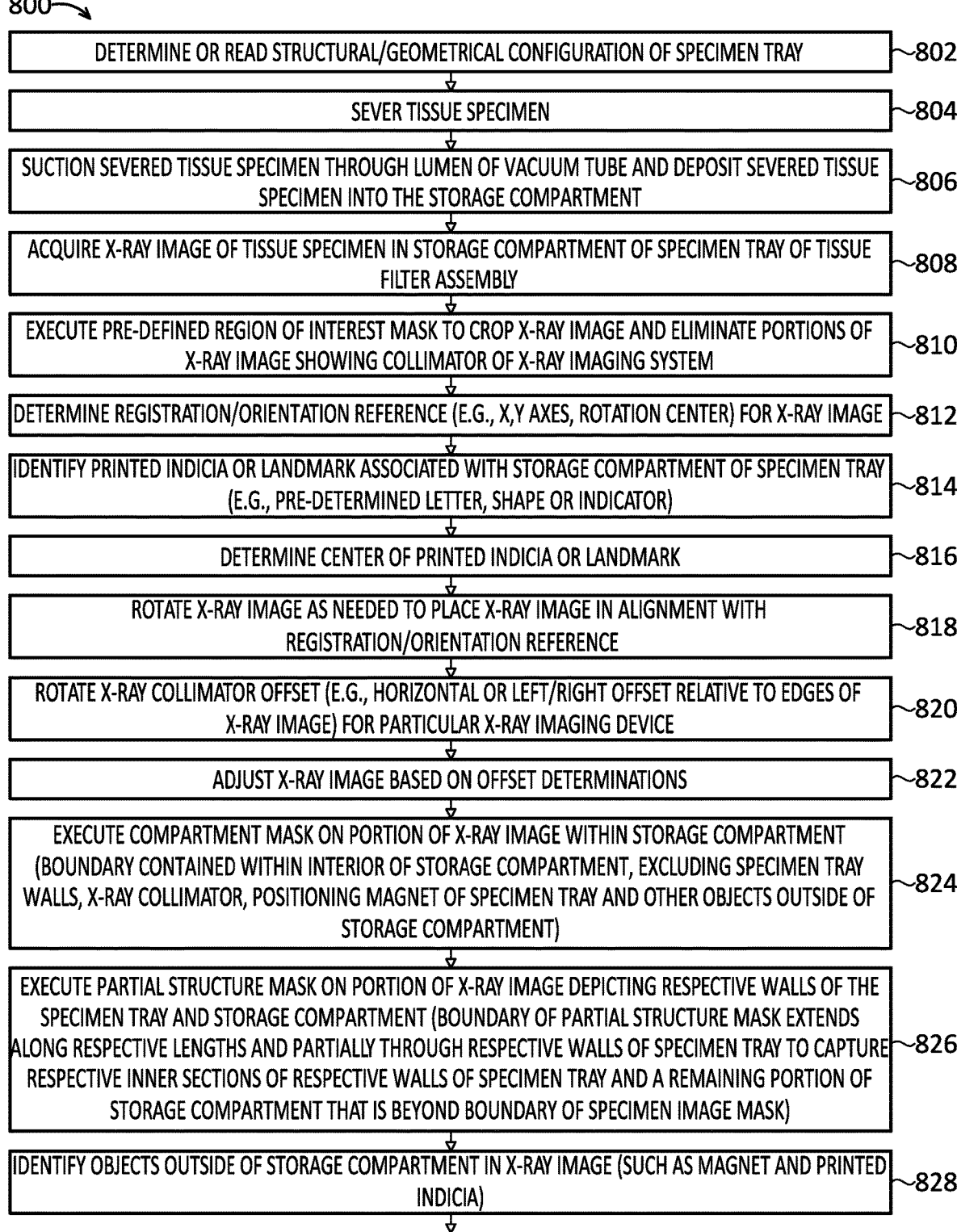

800

| | |
|---|---|
| DETERMINE OR READ STRUCTURAL/GEOMETRICAL CONFIGURATION OF SPECIMEN TRAY | ~802 |
| SEVER TISSUE SPECIMEN | ~804 |
| SUCTION SEVERED TISSUE SPECIMEN THROUGH LUMEN OF VACUUM TUBE AND DEPOSIT SEVERED TISSUE SPECIMEN INTO THE STORAGE COMPARTMENT | ~806 |
| ACQUIRE X-RAY IMAGE OF TISSUE SPECIMEN IN STORAGE COMPARTMENT OF SPECIMEN TRAY OF TISSUE FILTER ASSEMBLY | ~808 |
| EXECUTE PRE-DEFINED REGION OF INTEREST MASK TO CROP X-RAY IMAGE AND ELIMINATE PORTIONS OF X-RAY IMAGE SHOWING COLLIMATOR OF X-RAY IMAGING SYSTEM | ~810 |
| DETERMINE REGISTRATION/ORIENTATION REFERENCE (E.G., X,Y AXES, ROTATION CENTER) FOR X-RAY IMAGE | ~812 |
| IDENTIFY PRINTED INDICIA OR LANDMARK ASSOCIATED WITH STORAGE COMPARTMENT OF SPECIMEN TRAY (E.G., PRE-DETERMINED LETTER, SHAPE OR INDICATOR) | ~814 |
| DETERMINE CENTER OF PRINTED INDICIA OR LANDMARK | ~816 |
| ROTATE X-RAY IMAGE AS NEEDED TO PLACE X-RAY IMAGE IN ALIGNMENT WITH REGISTRATION/ORIENTATION REFERENCE | ~818 |
| ROTATE X-RAY COLLIMATOR OFFSET (E.G., HORIZONTAL OR LEFT/RIGHT OFFSET RELATIVE TO EDGES OF X-RAY IMAGE) FOR PARTICULAR X-RAY IMAGING DEVICE | ~820 |
| ADJUST X-RAY IMAGE BASED ON OFFSET DETERMINATIONS | ~822 |
| EXECUTE COMPARTMENT MASK ON PORTION OF X-RAY IMAGE WITHIN STORAGE COMPARTMENT (BOUNDARY CONTAINED WITHIN INTERIOR OF STORAGE COMPARTMENT, EXCLUDING SPECIMEN TRAY WALLS, X-RAY COLLIMATOR, POSITIONING MAGNET OF SPECIMEN TRAY AND OTHER OBJECTS OUTSIDE OF STORAGE COMPARTMENT) | ~824 |
| EXECUTE PARTIAL STRUCTURE MASK ON PORTION OF X-RAY IMAGE DEPICTING RESPECTIVE WALLS OF THE SPECIMEN TRAY AND STORAGE COMPARTMENT (BOUNDARY OF PARTIAL STRUCTURE MASK EXTENDS ALONG RESPECTIVE LENGTHS AND PARTIALLY THROUGH RESPECTIVE WALLS OF SPECIMEN TRAY TO CAPTURE RESPECTIVE INNER SECTIONS OF RESPECTIVE WALLS OF SPECIMEN TRAY AND A REMAINING PORTION OF STORAGE COMPARTMENT THAT IS BEYOND BOUNDARY OF SPECIMEN IMAGE MASK) | ~826 |
| IDENTIFY OBJECTS OUTSIDE OF STORAGE COMPARTMENT IN X-RAY IMAGE (SUCH AS MAGNET AND PRINTED INDICIA) | ~828 |

FIG. 8

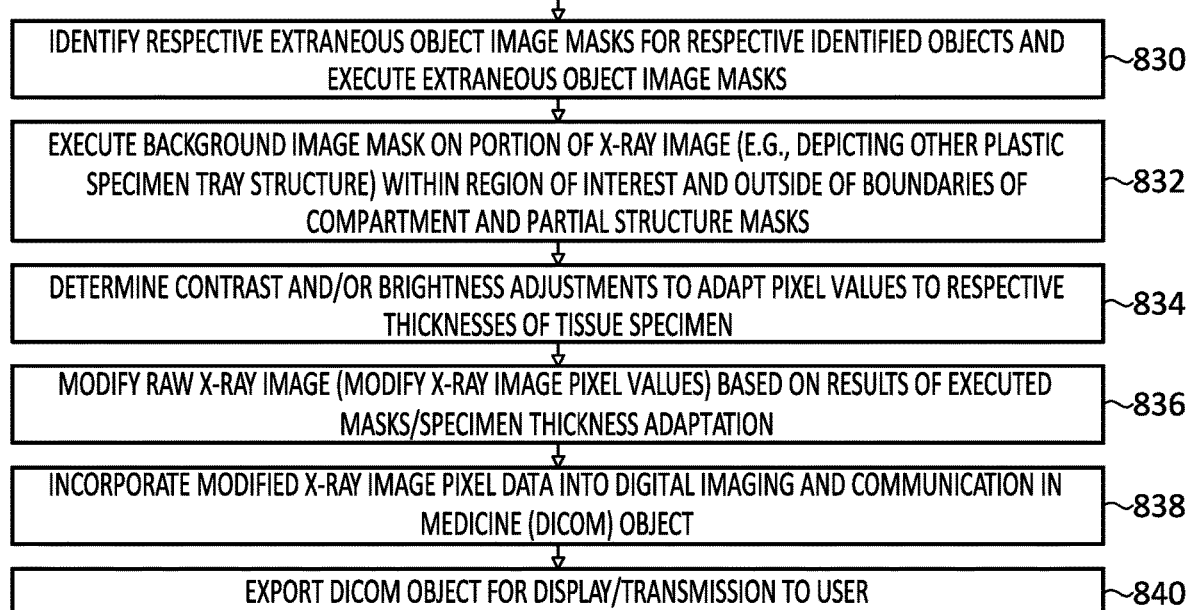

IDENTIFY RESPECTIVE EXTRANEOUS OBJECT IMAGE MASKS FOR RESPECTIVE IDENTIFIED OBJECTS AND EXECUTE EXTRANEOUS OBJECT IMAGE MASKS ~830

EXECUTE BACKGROUND IMAGE MASK ON PORTION OF X-RAY IMAGE (E.G., DEPICTING OTHER PLASTIC SPECIMEN TRAY STRUCTURE) WITHIN REGION OF INTEREST AND OUTSIDE OF BOUNDARIES OF COMPARTMENT AND PARTIAL STRUCTURE MASKS ~832

DETERMINE CONTRAST AND/OR BRIGHTNESS ADJUSTMENTS TO ADAPT PIXEL VALUES TO RESPECTIVE THICKNESSES OF TISSUE SPECIMEN ~834

MODIFY RAW X-RAY IMAGE (MODIFY X-RAY IMAGE PIXEL VALUES) BASED ON RESULTS OF EXECUTED MASKS/SPECIMEN THICKNESS ADAPTATION ~836

INCORPORATE MODIFIED X-RAY IMAGE PIXEL DATA INTO DIGITAL IMAGING AND COMMUNICATION IN MEDICINE (DICOM) OBJECT ~838

EXPORT DICOM OBJECT FOR DISPLAY/TRANSMISSION TO USER ~840

FIG. 8 (CONT'D)

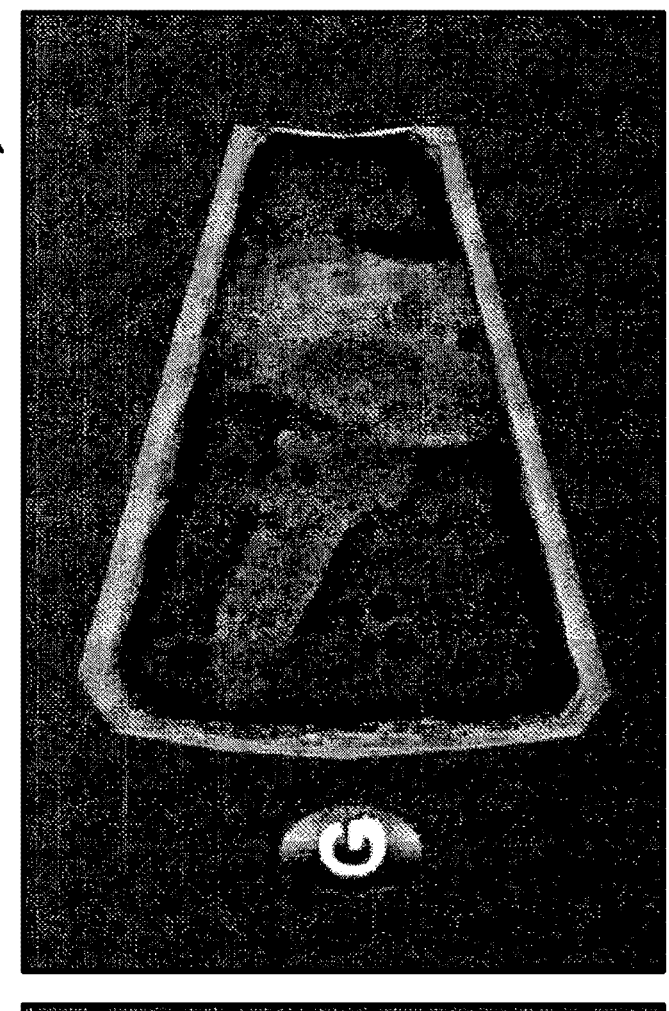
150m
FIG. 11B
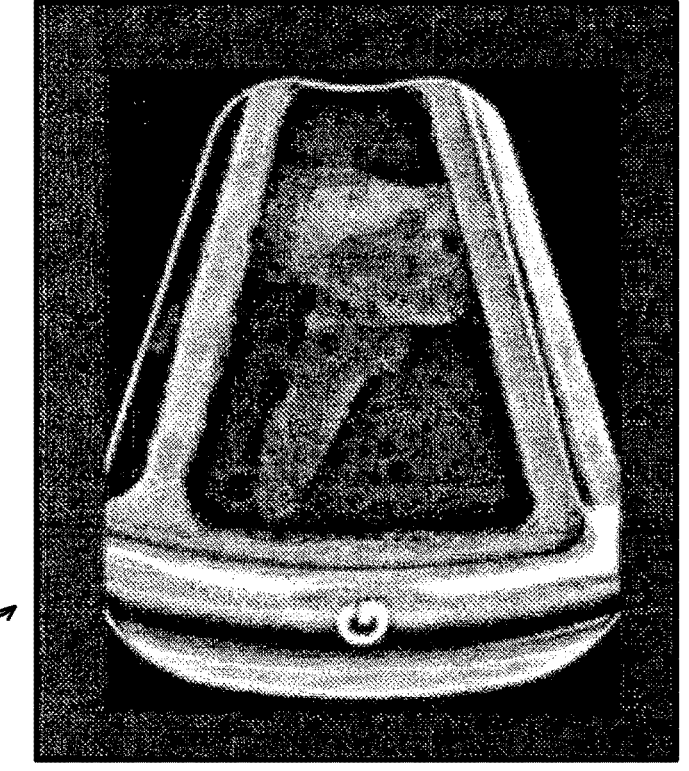
150
FIG. 11A

SYSTEMS METHODS AND COMPUTER PROGRAM PRODUCTS FOR SELECTIVELY MODIFYING X-RAY IMAGES OF TISSUE SPECIMENS

This application is a National Stage Application of PCT/US2021/026877, filed Apr. 12, 2021, which claims the benefit of priority to U.S. Provisional Patent Application Ser. No. 63/018,372, filed Apr. 30, 2020, the entire disclosures of which are incorporated by reference in their entireties. To the extent appropriate, a claim of priority is made to each of the above disclosed applications.

FIELD

The disclosed inventions generally relate to imaging of biopsy tissue specimens, and more particularly, to systems, methods and computer program products for modifying and enhancing X-ray images of tissue specimens, which may be done in real-time during a biopsy procedure.

BACKGROUND

Biopsies are well-known medical procedures involving the removal of tissue from a living body and examining the tissue for diagnostic study, such as determining the presence, cause or extent of a disease. For example, a biopsy of human breast tissue may be performed for diagnosing breast cancer or other diseases. The current standard of care is a percutaneous biopsy, which is performed by inserting a biopsy device having a needle and a cutting device through a small incision and advancing the needle and cutting device to the site of the tissue of interest. The cutting device then cuts a sample of tissue, captures the tissue specimen and removes the tissue specimen through the small incision. Percutaneous biopsy devices have used various means to remove the tissue specimen, such as simply removing the device out through the incision with the captured tissue specimen, or transporting the tissue specimen out through the device where it can be removed or drawn through a tube to a container. One advantage of removing the tissue specimen from the biopsy device is that multiple samples may be taken without having to remove the biopsy device from the patient.

The tissue specimen is typically imaged for verification using X-ray imaging systems. For instance, the tissue specimen may be placed into an X-ray specimen tray or container and then placed into a specimen imaging device for taking an image of the tissue. Automated biopsy and imaging systems for performing a biopsy and imaging a tissue specimen have also been disclosed. One example of a tissue biopsy and handling apparatus is described in U.S. Pat. No. 9,492,130, the contents of which are incorporated herein by reference as though set forth in full. In particular, U.S. Pat. No. 9,492,130 discloses an integrated biopsy analysis system having a biopsy excision tool, a tissue specimen transport mechanism for automatically transporting an excised tissue specimen from the biopsy excision tool to an analysis/imaging unit, and an analysis/imaging system for automatically analyzing tissue specimen images acquired by an X-ray imaging device. The system excises tissue specimens and transfers and places the excised tissue specimens into a specimen holder having a plurality of tissue accepting slots for placing a plurality of different tissue specimens. The imaging unit is configured to acquire images of the tissue specimens in the tissue holder, such as by acquiring individual images of each tissue specimen in its respective tissue accepting slot.

Known biopsy and imaging systems, however, have some drawbacks and can be improved. For example, while X-ray images generated by known biopsy and imaging systems may be informative and useful, certain content of X-ray images may be distracting and cause eye fatigue due to imaging of associated specimen holder structures and image portions with different brightness. Some image portions may be substantially brighter than others (e.g., metallic objects) with the result that a user's attention may be drawn to these areas initially and during the course of specimen review. Otherwise, such bright spots are in the field of view of the user when reviewing X-ray images. These distractions and interruptions resulting from imaging of non-specimen objects can be inconvenient, time consuming and may impair a viewer's analysis and stamina, and these drawbacks are compounded as a user engages in longer review sessions and is required to review larger numbers of specimen images. Such drawbacks also disrupt the review workflow as a result of having to spend extra time on lower quality images.

Other biopsy and imaging systems have been designed to improve fluid control during X-ray image acquisition since fluids in the imaging field can result in reduce image quality. For example, when acquiring an image using an X-ray imaging device, fluids may partially or completely cover or obscure a tissue specimen and/or adhere to the top of or partially or completely cover a tissue specimen. Interfering fluids may have attenuation attributes that are similar to tissue specimens being imaged and obscure portions of a specimen. An imaged tissue specimen may thus appear similar to cancerous tissue or tissue having characteristics indicative of cancer, such as a mass, tumor or calcification. Interfering fluid may also appear as a shadow that blocks image portions of interest.

To address these shortcomings, filter tray assemblies have been designed with structures to manage fluid in the imaging field during X-ray imaging of tissue specimens. Fluid management may involve keeping fluids from entering the imaging field and/or removing fluid that enters the imaging field using different types of fluid control structures.

However, these additional fluid control structures, which may be made of plastic or other radiopaque materials, are also imaged with the specimen and end up appearing in the resulting X-ray image. Thus, while these additional structures may improve fluid management, they may also contribute to various X-ray image drawbacks noted above due to additional fluid management structures being imaged.

SUMMARY

Embodiments of tissue biopsy and handling systems, methods and imaging algorithms described herein provide for improved X-ray imaging by selectively modifying X-ray images, which may be done in in real time or in-line with tissue extraction and processing.

Embodiments of tissue biopsy and handling systems, methods and imaging algorithms described herein provide for improved X-ray imaging by selectively modifying X-ray images of specimen trays including specimens and that have additional structures for improving fluid management structures during X-ray imaging.

Embodiments of tissue biopsy and handling systems, methods and imaging algorithms also provide for improved tissue specimen X-ray images that are cleaner and more focused to emphasize image portions of interest while deemphasizing or eliminating distracting image portions to maintain viewer attention.

Embodiments of tissue biopsy and handling systems, methods and imaging algorithms also provide for improved tissue specimen X-ray images that are easier on a viewer's eyes and thus improve viewer eye fatigue compared to raw X-ray images as generated by an X-ray imaging device.

Embodiments of tissue biopsy handling systems, methods and imaging algorithms also provide for improved imaging of specimens in various types and configurations of specimen trays. Specimen trays may be made of plastic and other radiopaque materials and that include different radiopaque objects such as a magnet serving as a compartment reference or "zero" position marker and printed indicia.

Embodiments also provide for specimen imaging that is adaptive to manufacturing imperfections and collimator offsets during imaging.

Embodiments provide for improved imaging of specimens by utilizing a partial structure mask that is executed so that an outer portion of a specimen tray wall such as a divider wall, is deemphasized or eliminated, while the inner portion of the wall defining a tissue storage compartment is maintained or enhanced. In other words, the boundary of the partial structure mask does not encompass the entire width or thickness of a specimen tray wall, and this partial thickness boundary may extend for the length of the walls or perimeter. In this manner, the partial structure mask captures a portion of respective walls (the inner wall sections defining or adjacent to a tissue storage compartment) and a remaining portion of the storage compartment that was not encompassed by or that is beyond the boundary of an imaging mask for the internal compartment. For example, a partial structure mask may include the inner 25% to 50% of a wall, whether linear or arcuate in shape or other shape. Embodiments thus show select, pertinent wall structures, and more particularly, a portion of a specimen tray wall that is closest to or adjacent to the storage compartment or specimen, while deemphasizing or eliminating outer wall structures that may be visually distracting and not necessary.

According to one embodiment, a computer-implemented method executed by a biopsy tissue handling apparatus comprises acquiring, by an X-ray imaging system of the biopsy tissue handling apparatus, an X-ray image of the tissue specimen that is in a storage compartment of a specimen tray. The method further comprises generating a modified X-ray image by an image processor in communication with the X-ray imaging system executing an imaging algorithm. The modified X-ray image is generated by the image processor executing an imaging algorithm comprising executing a plurality of image masks that are based at least in part on a geometric configuration of at least a portion of the specimen tray including the storage compartment with the tissue specimen. A compartment mask is executed on a portion of the X-ray image that depicts a storage compartment with a severed tissue specimen. The compartment mask boundary substantially corresponds to a contour of the storage compartment defined specimen tray walls, which may be linear or curved/arcuate. A partial structure mask is executed on a portion of the X-ray image depicting respective walls of the specimen tray and a portion of the storage compartment. A boundary of the partial structure mask extends along respective lengths and partially through respective walls of the specimen tray and captures a portion of the wall thickness and a portion of the storage compartment that is not encompassed by the compartment mask.

Thus, the partial structure mask boundary extends along the length or perimeter of the specimen tray walls, and partially into the specimen tray walls (e.g., to the first quarter, first third or first half of the specimen tray walls). In other words, in such embodiments, the boundary of the partial structure mask does not encompass an entire width or thickness of a specimen tray wall. In this manner, a partial structure mask captures respective inner sections or portions of respective walls of the specimen tray while also capturing a remaining portion of the storage compartment that was not included in and is beyond the boundary of the compartment mask, thereby showing selected pertinent wall structures relative to the compartment and specimen, while deemphasizing or eliminating outer wall structures that may not be of interest and visually distracting.

In another embodiment, a biopsy tissue handling apparatus includes a specimen tray, a tube, an X-ray imaging system, and a display. The specimen tray defines one or more storage compartments or chambers for holding one or more tissue specimens. The tube defines a vacuum lumen that is in communication with a storage compartment such that the tube can receive a severed tissue specimen and deliver the severed tissue specimen with a fluid through the vacuum lumen into the storage compartment. The X-ray imaging system is positioned or arranged relative to the tissue storage compartment to acquire an X-ray image of the severed tissue specimen in the storage compartment of the specimen tray. An image processor in communication with the X-ray imaging system is programmed or configured to execute an imaging algorithm that modifies the X-ray image by executing a plurality of image masks, which are based at least in part on a geometric configuration of at least a portion of the specimen tray including the storage compartment with the tissue specimen. A compartment mask is executed on a portion of the X-ray image that depicts a storage compartment with a severed tissue specimen. The compartment mask boundary substantially corresponds to a contour of the storage compartment defined specimen tray walls. A partial structure mask is also executed on a portion of the X-ray image depicting respective walls of the specimen tray and the storage compartment. A boundary of the partial structure mask extends along respective lengths and partially through respective walls of the specimen tray and captures a portion of the wall thickness and a portion of the storage compartment that is not encompassed by the compartment mask. Other system embodiments may include one or more of a specimen tray, a tube, an X-ray imaging system, and a display and combinations thereof.

In a further embodiment, a non-transitory computer readable medium tangibly embodying one or more sequences of instructions that can be executed by one or more processors contained in one or more computing systems of a biopsy tissue handling apparatus to cause the one or more computing systems to acquire and modify an X-ray image by executing a computer-implemented methods and imaging algorithms of embodiments.

In one or more embodiments or options, the compartment mask is an internal compartment mask that excludes walls of the storage compartment, imaged portions of a collimator of the X-ray imaging device, and a magnet. The magnet may serve as a "zero" position marker for tissue storage compartments while the specimen tray is rotated about an axis. The compartment mask enhances or emphasizes at least one of a brightness and a contrast of pixels of the X-ray image depicting the tissue specimen in the compartment. The compartment mask may encompass the entire specimen or a portion of the specimen, and the remaining portion of the specimen may be encompassed by the partial structure mask.

In one or more embodiments or options, the partial structure mask is executed to mask, black or reduce at least one of a brightness and a contrast of pixels of the X-ray image depicting outer portions of respective plastic walls of the specimen tray outside of the boundary of the partial structure mask, and the partial structure mask boundary is determined or based on a pre-determined point within a wall (e.g., a midpoint) or a pre-determined distance from the boundary of the compartment mask.

In one or more embodiments or options, the boundary of the partial structure mask is substantially the same shape as and encompasses the boundary of the compartment mask, which, in one embodiment, includes a pair of linear boundary sections and a pair of curved/arcuate boundary sections extending between the linear boundary sections. Other compartment mask and partial structure mask configurations may be utilized.

In a single or multiple embodiments or options, the image processor executes an extraneous object mask on a portion of the X-ray image that depicts an object, such as a magnet or printed indicial embedded within, affixed to or applied to the specimen tray. For example, a metallic magnet may be embedded within a plastic wall section of a specimen tray and may serve as a reference or "zero" position compartment marker and be used to engage another magnet for rotating the specimen tray. For these types of objects (e.g., metal objects), the mask may substantially correspond to an outer perimeter of the magnet and mask out, black or reduce at least one of a brightness and a contrast of pixels of the X-ray image depicting the radiopaque magnet, which initially appears as a bright white spot in the original X-ray image. Thus, embodiments reduce or eliminate the magnet's prominence and tendency to attract the viewer's attention in the X-ray image. As another example, the object may be printed indicia such as a number or character printed in tungsten ink that is associated with or identifies a tissue compartment. For these types of objects, a boundary of the extraneous object mask (e.g., a square or rectangle surrounding the indicia) defines an area that includes the indicia and that is to be included in the modified image. Thus, depending on the type of object identified or indicated by a user, the object may be deemphasized or eliminated (e.g., for metal magnet) or selected and included in the modified X-ray image.

In one or more embodiments or options, the boundary of the compartment mask includes a first linear boundary section, a second linear boundary section, a first arcuate boundary section, a second arcuate boundary section and a third arcuate boundary section. The first arcuate boundary section extends between the first linear boundary section and the second linear boundary section, the second arcuate boundary section extends between the first linear boundary section and the third arcuate boundary section, and the third boundary section extends between the second arcuate boundary section and the second linear boundary section. With this compartment mask configuration, a radius of curvature of the third arcuate section of the compartment mask, e.g., adjacent to an imaged portion of a magnet, is smaller than respective radii of curvature of respective first and second arcuate boundaries of the specimen and tray structure masks. The partial structure mask may be the same shape as a compartment mask, or in other embodiments, a portion of the boundary of the tray structure mask can extend through an area defined by the boundary of the extraneous object mask, e.g., an imaged portion of a magnet such that the boundaries of the compartment and partial structure masks may be different shapes.

In a single or multiple embodiments or options, an image mask executed by the image processor is a pre-defined region of interest mask that is operable to initially crop the X-ray image, e.g., to eliminate portions of the X-ray image depicting a metal collimator of the X-ray imaging system. In a single or multiple embodiments or options, the pre-defined region of interest mask is a first image mask executed on a raw X-ray image and before execution of the compartment and partial structure masks.

In a single or multiple embodiments or options, the geometric configuration of at least the portion of the specimen tray and/or orientation of image masks that are executed are based at least in part on a center, e.g., mass center, of printed indicia associated with a storage compartment. If needed, the X-ray image is rotated to align the center of the printed indicia with a pre-determined axis (e.g., horizontal axis) in order to register or align the X-ray image with a geometric configuration of the specimen tray and/or image masks initially configured for a properly aligned image can be rotated. Mask orientations and associated structural or geometric specimen tray configuration may also be rotated for these purposes. Thus, embodiments can automatically compensate for and adapt to rotational or mechanical inconsistencies of the biopsy tissue handling apparatus and so that the geometric configuration can be utilized to determine corresponding sections in the X-ray image when executing image masks.

In a single or multiple embodiments or options, the image processor determines offset values of a collimator of the X-ray imaging device, e.g., horizontal offset values relative to sides or left and right ends of the imaged tissue compartment for horizontal adjustment or registration of the X-ray image or portion thereof and/or to adjust where image masks are executed so that the image masks are applied to determine corresponding sections in the X-ray image.

In a single or multiple embodiments or options, the biopsy tissue handling apparatus deposits, through a vacuum lumen in communication with the storage compartment, the severed tissue specimen into the storage compartment.

In a single or multiple embodiments or options, the generated or raw X-ray image is modified by changing pixel values according to the plurality of masks, and incorporating modified X-ray image pixel data into a Digital Imaging and Communication in Medicine (DICOM) object. Other data formats may also be utilized.

In a single or multiple embodiments or options, image masks are executed and an X-ray image is modified in real time during processing of the severed tissue specimen.

In a single or multiple embodiments or options, the brightness values of pixels of the X-ray image depicting the tissue specimen are selectively modified to adapt respective brightness levels to respective different thicknesses of the imaged tissue specimen. For example, portions of the X-ray image depicting a thinner part of the specimen in contrast to a thicker part of the specimen can be identified such that pixel adjustments can be made based on different specimen thicknesses, e.g., brightness values of pixels for thinner and thicker specimen portions are enhanced with respective brightness and contrast so that specimen edges, of both thinner and thicker specimen portions, can be delineated while the thicker specimen portion is not too bright. Thus, pixel values can be selectively adapted across specimen thicknesses.

BRIEF DESCRIPTION OF THE DRAWINGS

The foregoing and other aspects of embodiments of the herein disclosed inventions are described in further detail with reference to the accompanying drawings, wherein like reference numerals refer to like elements and the description for like elements shall be applicable for all described embodiments wherever relevant:

FIG. 2 is a flow diagram of a method for modifying an X-ray image of a tissue specimen according to one embodiment;

FIG. 3 is a flow diagram of a method for modifying an X-ray image of a tissue specimen according to one embodiment;

FIGS. 4A-B depict a tissue biopsy and handling system operable to execute embodiments and for performing breast biopsy procedures and real time imaging of breast tissue specimens during a biopsy procedure, wherein FIG. 4A illustrates an imaging cabinet in an open position, and FIG. 4B illustrates an imaging cabinet in a closed position;

FIGS. 7A-M depict examples of tissue filter assemblies of a tissue biopsy and handling system in further detail and including tissue storage compartments in which tissue specimens and fluids are deposited during a biopsy procedure, wherein FIGS. 7A-D depict one example tissue filter assembly with a rotatable specimen tray, and FIGS. 7E-M depict a tissue filter assembly that also includes additional fluid management structures including a fluid channel and flow comb;

FIG. 8 is a flow diagram of a method for modifying an X-ray image of a tissue specimen according to one embodiment;

FIGS. 10A-B are X-ray images demonstrating visual enhancements achieved by embodiments, wherein FIG. 10A is a raw X-ray image of a portion of a specimen tray including an imaged magnet, and FIG. 10B is a modified X-ray image generated according to embodiments; and FIGS. 11A-B are X-ray images demonstrating visual enhancements achieved by embodiments, wherein FIG. 11A is a raw X-ray image of a portion of a specimen tray that does not include a magnet, and FIG. 11B is a modified X-ray image generated according to embodiments.

DETAILED DESCRIPTION

Embodiments provide for tissue biopsy and handling systems, methods and imaging algorithms that selectively modify X-ray images of tissue specimens by executing image masks and a structural or geometric configuration of at least a portion of the specimen tray that was imaged and depicted in the X-ray image. Modified X-ray images generated according to embodiments are cleaner and more focused than a traditional or raw X-ray image, which may be cluttered with extraneous and bright areas that can be very distracting to viewers and contribute to viewer fatigue and reduced review throughput. Modified X-ray images generated according to embodiments emphasize or maintain pertinent image sections while deemphasizing or deleting image portions of extraneous or high attenuation objects such as magnets and various extraneous specimen tray structures. Embodiments are thus also particularly suited for X-ray imaging of involving specimen trays that have added structures for managing the control of fluids (such blood, saline, anesthetic, bio-fluids, etc.) into and out of an imaging field and that are imaged with the specimen. Embodiments are adaptable to modify X-ray images of various types of specimen tray structures. Further, given the manner in which embodiments execute, embodiments can adapt to mechanical and imaging variances of different imaging systems and components.

Embodiments advantageously execute to generate improved X-ray images, which may be after tissue processing or in real time during tissue processing For example, during a procedure, a tissue specimen is severed from a patient, aspirated through a vacuum tube together with a transport and/or bodily fluid such as saline, blood or a combination thereof, and deposited with the fluid into a storage compartment of a specimen tray. An X-ray image of the severed tissue specimen is acquired, and embodiments are executed to selectively modify the generated X-ray image. The resulting modified X-ray image, rather than the generated X-ray image, can then be presented to a radiologist or other user of the tissue biopsy and handling system through a display in real-time during the procedure. The modified X-ray image and the generated X-ray image can also be presented together for additional review and comparison. Image acquisition and embodiment execution may be performed while the patient remains on a stereotactic table, after the severed tissue specimen has been aspirated through a vacuum tube and deposited into the specimen tray, and before the tissue specimen has been removed from the specimen tray, before the tissue specimen is removed from a housing of the tissue biopsy and handling system.

Figure 1:
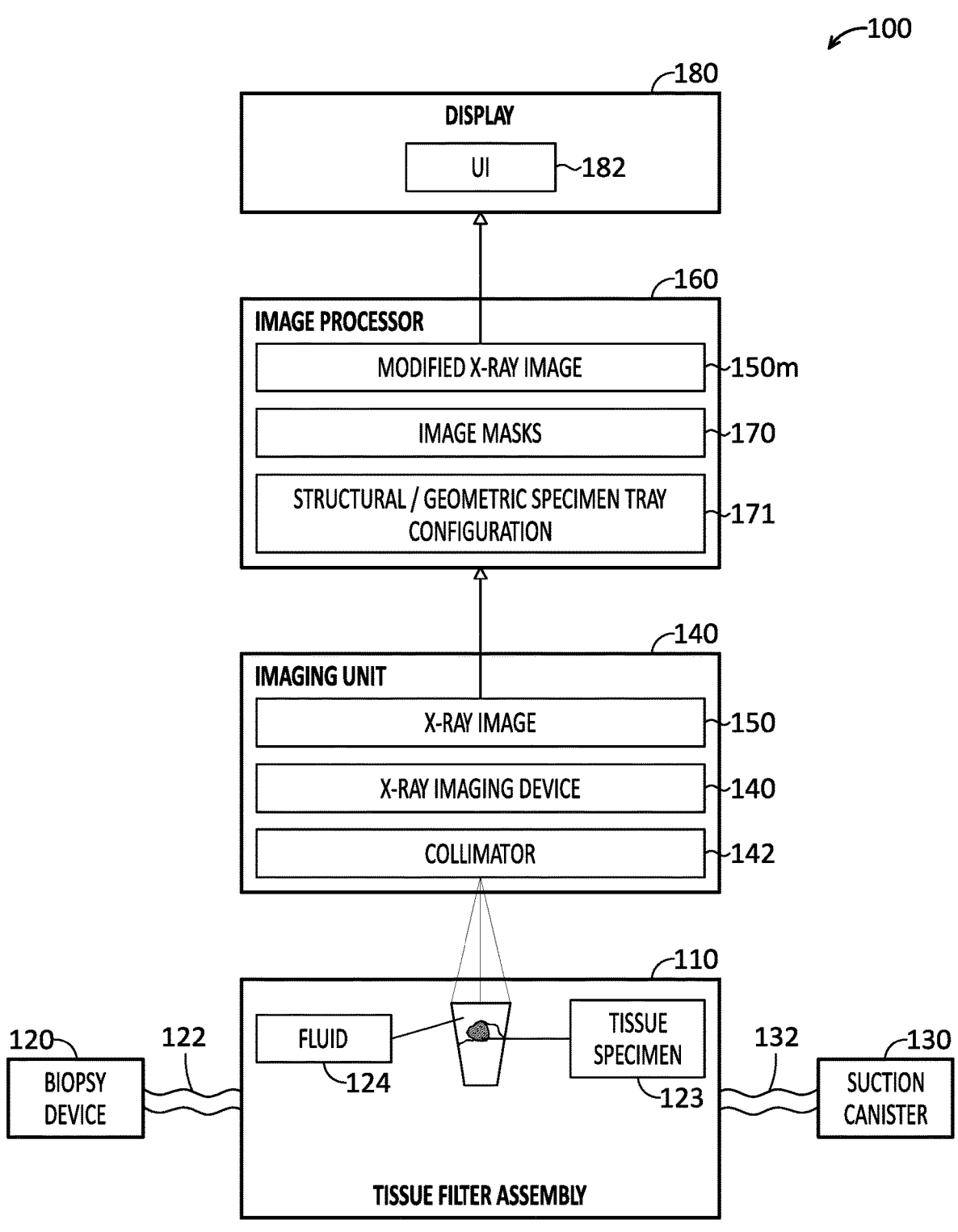
FIG. 1 is a block diagram of a tissue biopsy and handling system constructed according to one embodiment for X-ray imaging of tissue specimens and modifying X-ray images of tissue specimens.

Referring to FIG. 1, a schematic of a tissue biopsy and handling system 100 (generally, tissue biopsy system 100) constructed according to one embodiment is shown. While the schematic of FIG. 1 shows certain features of tissue biopsy system 100, tissue biopsy system 100 may include components and features of a tissue biopsy system as disclosed in U.S. Pat. No. 9,492,130 B2, the contents of which are incorporated herein by reference as though set forth in full.

The exemplary tissue biopsy system 100 includes a tissue filter or tissue holder assembly 110 (generally, tissue filter assembly 110). Tissue filter assembly 110 is attached to and connected between a biopsy excision tool 120 and a suction canister 130. Biopsy excision tool 120 and tissue filter assembly 110 are in fluid communication with each other via an inlet line 122. Tissue filter assembly 110 and suction canister 130 are in communication with each other through an evacuation suction line 132. A vacuum source (not shown in FIG. 1) is in communication with evacuation suction line 132 and/or suction canister 130 so that activation of vacuum source results in aspiration of a tissue specimen 123 excised by biopsy excision tool 120 and one or more bodily or added fluids 124 through inlet line 122 into a tissue storage compartment of a specimen tray of tissue filter assembly 110.

Tissue biopsy system 100 includes an imaging unit 140 that is positioned relative to tissue filter assembly 110 so that excised tissue specimen 123 and fluids 124 deposited into tissue filter assembly 110 are positioned in a field of view of imaging unit 140 including an X-ray imaging device 141 that generates an X-ray image 150. X-ray imaging device 141 utilizes photons within an energy range of about 10 keV to about 100 keV and wavelengths of about ~0.01 nm to ~10 nm. X-ray imaging device 141 is in communication with an image processor 160 that receives inputs including data of generated or X-ray image 150.

Image processor 160 according to embodiments generates a modified X-ray image 150$m$ ("m" referring to "modified") by executing an imaging algorithm that utilizes image masks 170 and a structural or geometric configuration 172 of at least a portion of specimen tray of tissue filter assembly 110 that was imaged and depicted in X-ray image 150. Image processor 160 is also in communication with a display 180 of tissue biopsy system 100 to present modified X-ray image 150$m$ to a user or operator of tissue biopsy system 100.

Referring to FIG. 2, in one embodiment of a computer-implemented method 200 executed by tissue biopsy system 100 generally illustrated in FIG. 1, at 202, after tissue specimen 123 and fluid 124 have been deposited into a tissue storage compartment of a specimen tray of tissue filter assembly 110, X-ray imaging device 141 is activated to acquire X-ray image 150 of severed tissue specimen 123. At 204, image processor 160 executes imaging algorithm to determine structural or geometric configuration 172 of at least a portion of the specimen tray that was imaged and depicted in X-ray image 150, and at 206, executes a plurality of image masks 170 on respective selected portions of X-ray image 150 generated by X-ray imaging device 141 based on structural or geometric configuration 172. The resulting selectively modified X-ray image is generated by modifying certain pixels of the X-ray image 150. Modified X-ray image 150$m$ can then be presented to user via UI 182 of display 180 or otherwise communicated or stored at 208.

Referring to FIG. 3, in one embodiment of a computer-implemented method 300 executed by tissue biopsy system 100 generally illustrated in FIG. 1, at 302, X-ray imaging device 141 is activated to acquire X-ray image 150 of tissue specimen 123 in storage compartment of specimen tray of tissue filter assembly 110. At 304, image processor determines a structural or geometric configuration 172 of at least a portion of specimen tray including the storage compartment with tissue specimen 123 that was imaged and depicted in X-ray image 150. At 306, image processor executes image masks 170 including an internal compartment mask and partial structure mask based at least in part on determined geometric configuration 171. At 308, image processor 160 selectively modifies X-ray image 150 based on results of mask execution, and at 310, displays modified X-ray image 150 to user via UI of display 180.

FIGS. 4-7M illustrate exemplary tissue biopsy systems 100 and tissue filter assemblies 110 thereof according to certain embodiments that may be used to implement and/or execute X-ray image modification embodiments. Aspects of exemplary tissue biopsy system components are described with reference to FIGS. 4-7M, with FIGS. 7E-M depicting embodiments with different fluid management configurations and associated additional structures. Further details of X-ray modification and imaging algorithms utilizing the exemplary tissue filter assemblies of FIGS. 7A-M are described with reference to FIGS. 8-11.

Figure 4A:
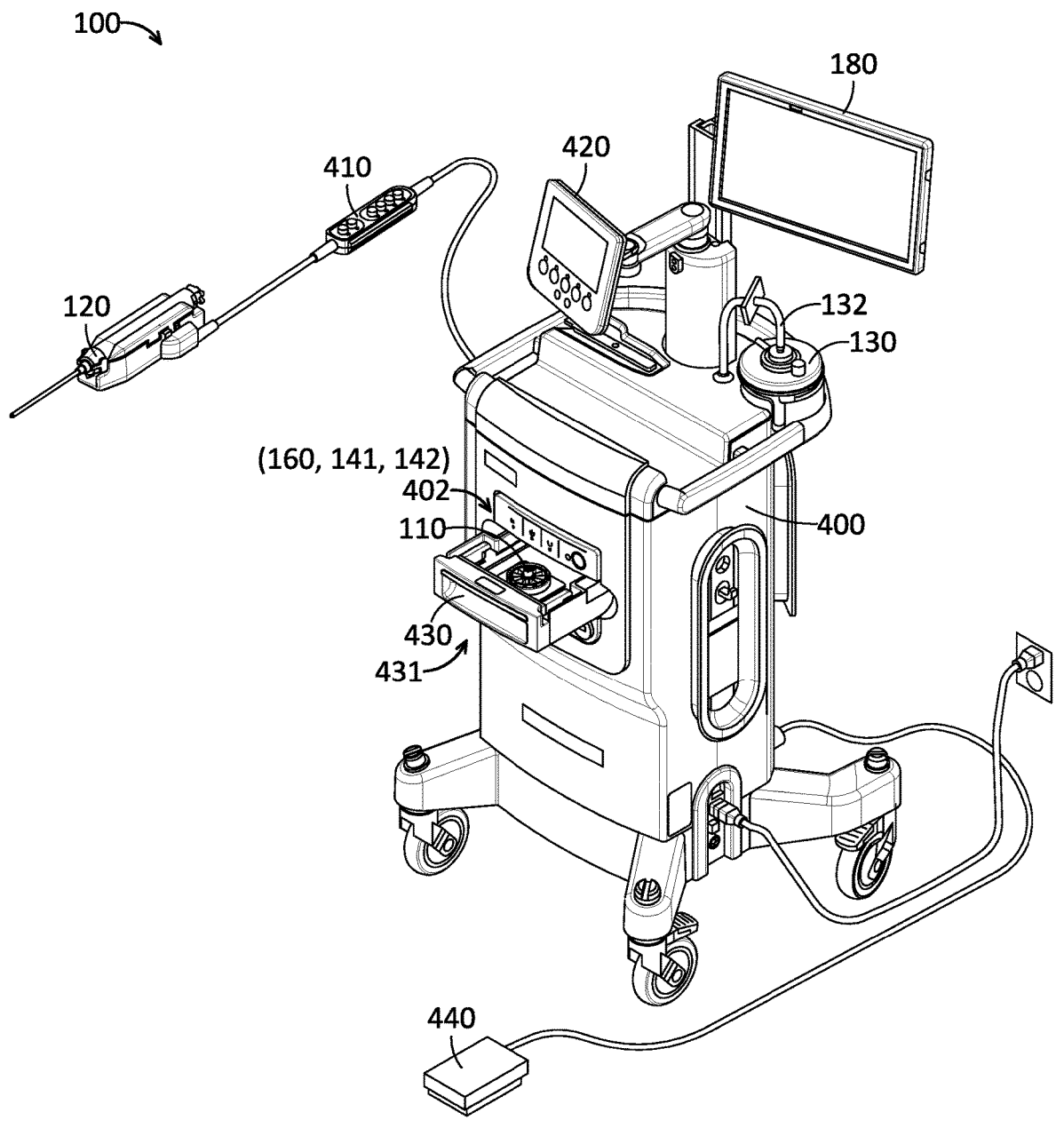
Figure 4B:
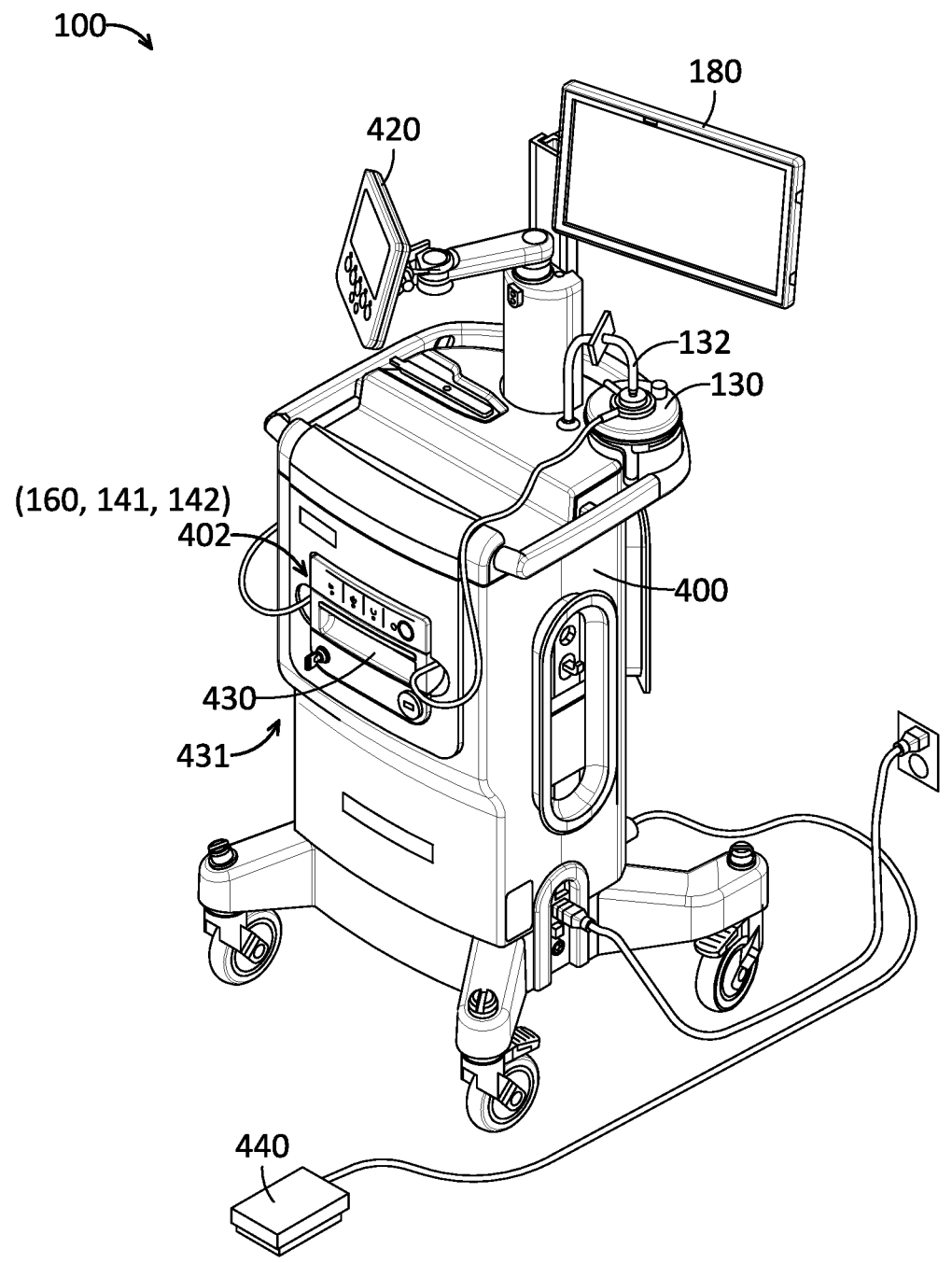

Referring to FIGS. 4A-B, exemplary tissue biopsy system 100 incorporating embodiments for real-time modification of X-ray images 150 of tissue specimens 123 is illustrated. In the illustrated embodiment, exemplary tissue biopsy system 100 includes a main housing or cabinet 400 that includes an imaging cabinet 402 and a filter drawer 430. Filter drawer 430 can slide within imaging cabinet 402 between an open position 431 (shown in FIG. 4A) and a closed position 432 (shown in FIG. 4B). In open position 431, filter drawer 430 is ejected or pulled out by radiologist to extend outwardly from imaging cabinet 402 thereby permitting insertion and removal of tissue filter assembly 110. Filter drawer 430 is pushed or inserted into imaging cabinet 402 and into closed position 432 in which X-ray imaging device 141 (located inside of imaging cabinet 402) is positioned relative to tissue filter assembly 110 such that severed tissue specimen 123 contained in tissue filter assembly 110 is positioned in a field of view of X-ray imaging device 141.

X-ray imaging device 141 may be configured so that X-ray image 150 is acquired with X-ray imaging device 141, and then tissue filter assembly 110 containing tissue specimen 123 is moved or rotated to position the next tissue specimen 123 in the field of view for imaging. The position of X-ray imaging device 141 may also be adjusted, but for ease of explanation and not limitation, reference is made to tissue filter assembly 110 or specimen tray thereof being rotatable to place tissue specimen 123 in a field of view of X-ray imaging device 141 in imaging cabinet 402.

In the illustrated embodiment shown in FIG. 4A, biopsy excision tool 120 is in communication with a remote control 410 that is operable by radiologist to activate and control the mode of operation and other controls of biopsy excision tool 120. FIGS. 4A-B also illustrate suction canister 130 and associated evacuation suction line 132 in communication with tissue filter assembly 110 through main housing 400. Suction canister 130 may be a disposable canister that serves for collection, retention and disposal of waste generated during the biopsy procedure including for one or more fluids 124 such as excess saline and/or blood aspirated through tissue filter assembly 110. Tissue biopsy system 100 may also include a footswitch 440 that allows the surgeon to manually activate and/or control the biopsy excision tool 120, and system mode or control status and/or system mode or control parameters can be displayed or adjusted via technologist control display 420.

Figure 5:
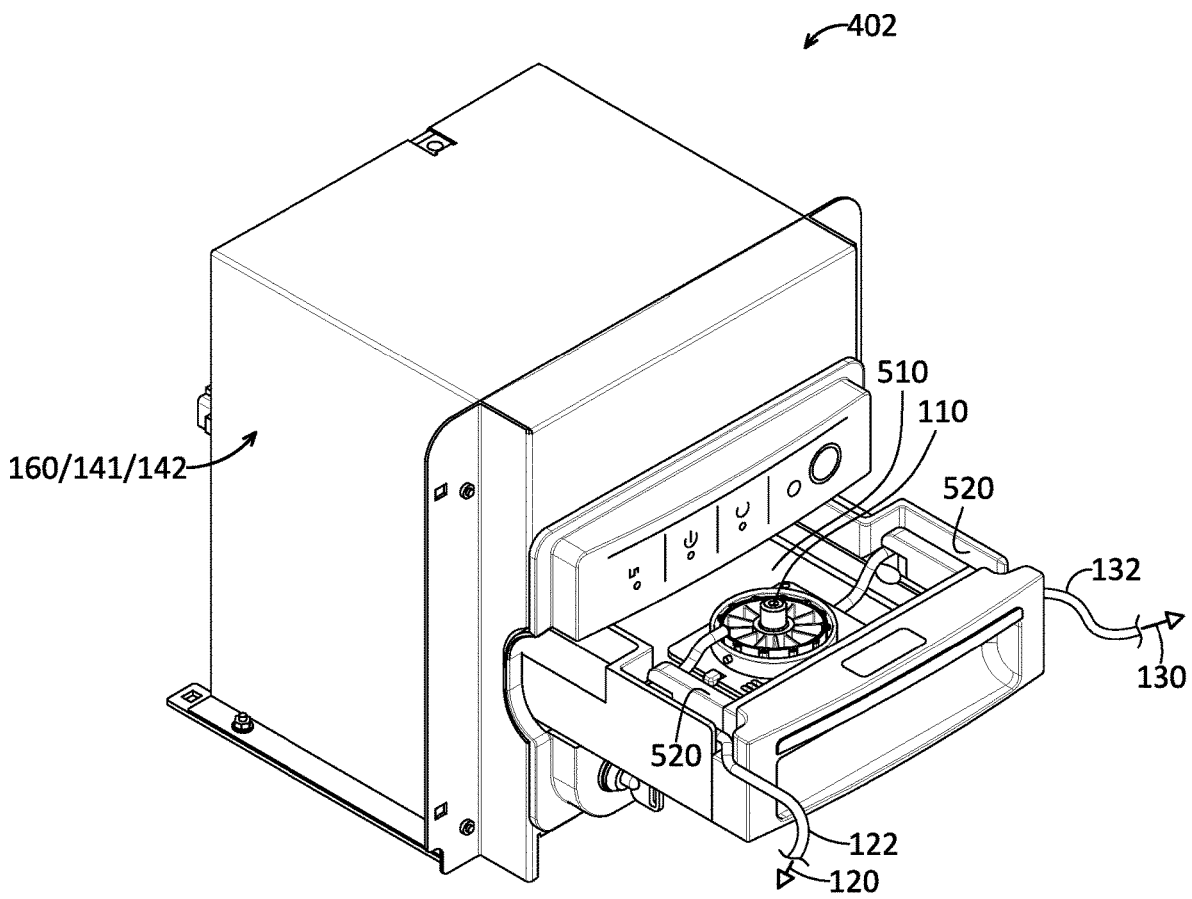
FIG. 5 depicts an embodiment an imaging cabinet of a tissue biopsy and handling system constructed according to one embodiment.

FIG. 5 illustrates in further detail how imaging cabinet 402 of tissue biopsy system 100 can be configured. In the illustrated embodiment, tissue filter assembly 110 defining respective tissue storage compartments is removably inserted into filter drawer 430. Filter drawer 430 is slidably inserted into and removed from imaging cabinet 402. Tissue filter assembly 110 is structured so that tissue storage compartments are positioned to be in communication with and between biopsy excision tool 120 via inlet line 122 and suction canister 130 via evacuation suction or outlet tube 132. During use, tissue specimen 123 and fluid 124 excised by biopsy excision tool 120 are aspirated through inlet line 122 and deposited into tissue storage compartments of tissue filter assembly 110. Excess fluid 124 may be aspirated through evacuation suction line 132 and into suction canister 130. Imaging cabinet 402 includes or houses X-ray imaging device 141, and imaging cabinet 402 includes a detector plate 510 for detecting emitted X-rays and generating X-ray image 150. Tissue specimen 123 is positioned in a field of view of X-ray imaging device 141, Image processor 160 may also be included in imaging cabinet 402, but embodiments are not so limited. For example, image processor 160 or components thereof may be located remotely relative to tissue biopsy system 100 to allow for remote image processing, remote execution of image masks 170 and remote execution of machine intelligence and object detection within tissue specimens 123. For ease of explanation, reference is made to real-time imaging and acquisition of X-ray image 150.

Filter drawer 430 defines tubing channels 520 for inlet line 122 and outlet or suction line 132. Vacuum source (not shown) is in communication with suction or outlet line 132 and/or suction canister 130 so that activation of vacuum source results in aspiration of tissue specimen 123 and fluid 124 through inlet line 122 and into a tissue storage compartment of tissue filter assembly 110. Waste or extra fluid may be aspirated through evacuation suction line 132 into suction canister 130.

Referring again to FIGS. 4A-B, and with continuing reference to FIG. 5, imaging cabinet 402 includes a control panel 460 with buttons or UI elements (for control panels in the form of a touchscreen) to allow a user to select or adjust various operating parameters of biopsy system 100 such as imaging parameters or filters and to request generation of modified X-ray image 150m according to embodiments, and display 180 is provided to present modified X-ray image 150m generated according to embodiments to user. In certain embodiments, these parameters may be adjusted via one or more UI elements 182 on the display 180.

For example, image processor 160 may execute imaging algorithm including one or more image masks 170 such as a predefined Region Of Interest (ROI) mask to exclude portions of X-ray image 150 depicting a metal collimator 142 of X-ray imaging device 141, a compartment mask executed on a portion of X-ray image 150 depicting a tissue storage compartment interior, a partial structure mask executed on a portion of X-ray image 150 depicting specimen tray walls and part of the compartment interior that is not encompassed by compartment mask, one or more extraneous object masks for other objects affixed to or embedded within specimen tray such as a magnet or printed indicia, and a background image mask, e.g., for other plastic surrounding or base materials. Image processor 160 is also in communication with computer display 180 of tissue biopsy system 100 to process user interactions via UI 182, e.g., to process user request for X-ray image modifications according to embodiments.

Figure 6:
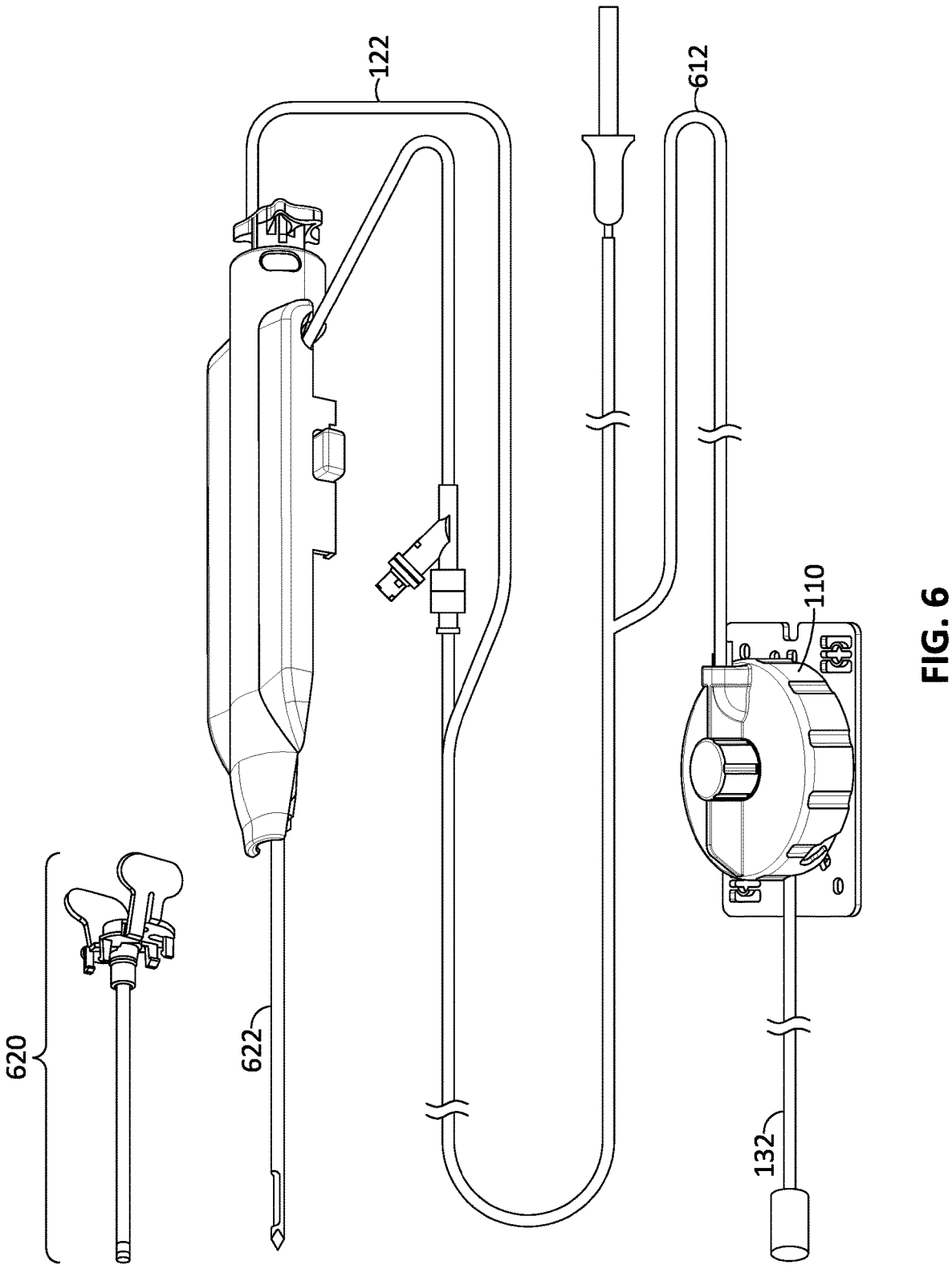
FIG. 6 depicts an example of a tissue biopsy and handling system that may be utilized to sever a tissue specimen in further detail and a tubing assembly through which fluids such as saline and blood may flow during a biopsy procedure.

Referring to FIG. 6, an exemplary biopsy excision tool 120 and tissue filter assembly 110 are shown. A distal end of biopsy excision tool 120 includes an introducer 620 for insertion of a biopsy needle 622 that is attached to a driver of the biopsy excision tool 120 and is configured for tissue extraction. For these purposes, a proximal end of biopsy excision tool 120 is in communication with a saline/aspiration tubing assembly 610 comprising inlet line 122 for delivery of saline fluid 124 and delivery of fluid to filter assembly 110. An exemplary saline/aspiration tubing assembly 610 as shown in FIG. 6 may include a suction line 612 through which tissue specimen 123 excised by needle 622 of biopsy excision tool 120 is aspirated together with fluid 124 such as saline that is introduced via one or more inlet values or saline lines 614. Excised tissue specimen 123 and fluid(s) 124 are aspirated through suction line 612 that is in communication with an inlet into filter assembly 110. An outlet of tissue filter assembly 110 is in fluid communication with suction canister 130 via evacuation suction line 132.

FIGS. 7A-D illustrate an exemplary configuration of tissue filter assembly 110 that is in fluid communication between biopsy excision tool 120 and suction canister 130. In the depicted embodiment, tissue filter assembly 110 includes a housing or cover 710 and a base 730. Cover 710 removably attaches onto base 730 to define an interior or chamber in which a tissue specimen holder or tray, or filter holder or specimen tray 720 (generally, specimen tray 720) is enclosed. Base 730 includes a spindle 732 that receives a hub 722 of specimen tray 720 such that specimen tray 720 is rotatable about a rotational axis 740 defined by the spindle 732 and rotatable relative to base 730 and cover 710 about axis 740. In other words, base 730 and cover 710 are stationary and specimen tray 720 rotates within the chamber defined by base 730 and cover 710. Specimen tray 720 may be rotated using any suitable actuator including a magnetic drive system (not shown in FIGS. 7A-D) in which one or more magnetic elements are disposed on or embedded within specimen tray 720, which rotates by a magnetic force of a magnet in an actuator.

In the embodiment illustrated in FIGS. 7A-D, base 730 includes a bottom member or surface 734 and a cylindrical, circumferential outer sidewall 736 (generally, sidewall 736). Sidewall 736 extends upwardly from bottom member 734 and has an inner diameter so that specimen tray 720 is rotatable by spindle 732 of base 730 that receives hub 722 of specimen tray 720 such that specimen tray 720 is rotatable about a rotational axis 740.

In the embodiment illustrated in FIGS. 7A-D, specimen tray 720 also includes a bottom member that may include a filter material 724 and a cylindrical, circumferential sidewall 726 (generally, sidewall 726) extending upwardly from bottom member 724. In certain embodiments, bottom surface 724 of specimen tray 720 includes a porous filter material. Filter material may be a single filter, such as a filter sheet that covers the entire bottom of specimen tray 720 and through which excess fluid 124 flows into suction canister 130. Alternatively, filter material may be individual filters disposed on the bottom of each tissue storage compartment 728.

Specimen tray 720 also includes a plurality of inner or dividing walls 727 (generally, dividing wall 727) extending radially from center or hub 722 to the inner surface of sidewall 726 to define respective tissue storage compartments 728. In the illustrated embodiment, specimen tray 720 defines 12 tissue storage compartments 728A-L (generally, tissue storage compartment 728). In the illustrated configuration, specimen tray 720 defines an angular arrangement of storage compartments 728 that are in the shape of "pie" or "wedge" shaped segments, each of which is defined by two dividing walls 727 and an arcuate portion of sidewall 726. Tissue storage compartments 728 are separated, and partially defined, by radially extending dividing walls 727. It will be understood that specimen tray 720 may define other numbers of tissue storage compartments 728 and have other configurations such that FIGS. 7A-D are provided for purposes of illustration and explanation, not limitation.

During a biopsy procedure, tissue specimens 123 and fluid(s) 124 are aspirated through biopsy needle 622 to in-line tissue storage chamber 728. Tissue chamber indicia or identifiers 750a-l (generally, compartment indicia 750) are provided to identify respective tissue storage compartments 728 and respective tissue specimens 123 therein. Compartment indicia 750 may be printed or engraved alphanumeric indicators. For example, radiopaque tungsten ink may be utilized for compartment indicia 750 so that they are visible in X-ray image 151. In the illustrated embodiment, compartment indicia 750 are alpha indicators in the form of letters A-L to identify respective 12 tissue storage compartments 728A-L.

Certain embodiments may involve initially reducing fluid 124 in tissue storage compartments 728 before tissue specimen 123 imaging. Embodiments are then executed for image processing of tissue specimens 123 in the presence of remaining fluid 124.

According to one embodiment, a fluid management device 760 may be disposed in the interior of base 730.

Embodiments may involve removal of fluids 124 from tissue storage compartment 728 with a mechanical device in the form of fluid management device 760 to address fluids 124 remaining in tissue storage compartments 728 and that continue to interfere with imaging of severed tissue specimens 123.

FIGS. 7E-M depict another exemplary configuration of filter assembly 110 that is in fluid communication between biopsy excision tool 120 and suction canister 130 and including additional structures for improved fluid management and to control removal of fluids 124 from tissue storage compartment 728. FIGS. 7E-M illustrate one embodiment of a tissue filter assembly 110 for receiving a plurality of tissue samples and with a base 730 that is structurally configured for enhanced fluid management.

In the illustrated embodiment, tissue filter assembly 110 includes a housing having a base 730 and a cover 710 which removably attaches onto the base 730. Base 730 and attached cover 710 form an interior or chamber in which specimen tray 720 is enclosed. As discussed above with reference to FIGS. A-D, base 730 has a hub with a spindle which receives a hub of specimen tray 720 such that specimen tray 720 is rotatable relative to the housing 710 about an axis 740, e.g., using a magnetic drive system. The bottom of tissue specimen tray 720 has a tissue filter 724 comprising a porous filter material.

Base 730 has a bottom surface 734 and a circumferential sidewall 736 extending upwardly from bottom surface 734. Tissue filter assembly 110 also includes a platform 760 with a platform opening 762. A fluid channel 764 is located below platform 760 (see dashed arrow in FIG. 7E pointing to fluid channel 764 below platform 760). As used in this specification, the term "fluid channel" may be any passage that is capable of transporting fluid, such as gas (e.g., air) and/or liquid.

Platform 760 has a planar horizontal surface. In some embodiments, the bottom of specimen tray 720 may rest on the planar horizontal surface of platform 760 as specimen tray 720 rotates relative to base 730. In other embodiments, the bottom of specimen tray 720 may be spaced away from the planar horizontal surface of platform 760 by a small distance, such as less than 0.5 mm, less than 0.2 mm, less than 0.1 mm, or less than 0.05 mm. Fluid channel 764 extends circumferentially around hub 731 of base 730 underneath platform 760, and is in fluid communication with a plenum 766 at base 730. Suction line 132 is coupled to plenum 766 for applying suction inside plenum 766 and fluid channel 764. Tissue filter assembly 110 also includes flow comb 768 located below platform opening 762. In some embodiments, flow comb 768 may extend from platform opening 762 into fluid channel 764. During use, fluid from specimen tray 720 is drawn into platform opening 762 due to suction in fluid channel 764 applied by suction line 132. Flow comb 768 breaks up the fluid, which is transported by fluid channel 764 around hub 731 of base 730 to reach plenum 766. Plenum 766 allows a certain amount of fluid to be collected while fluid is being suctioned by suction line 132 out of plenum 766 via outlet or vacuum port 770. In some embodiments, outlet port 770 has an inner diameter of 0.26 inch. In other embodiments, outlet port 770 may have an inner diameter of other dimensions, which may be larger than 0.26 inch or smaller than 0.26 inch.

In one embodiment, fluid channel 764 extends about 270° (e.g., 270°±20°) circumferentially around hub 731 of base 730 such that fluid in fluid channel 764 travels an angular distance of about 270° circumferentially around hub 731 to reach plenum 766. In other embodiments, fluid channel 764 may extend around hub 731 circumferentially through other angular range. For example, fluid channel 764 may extend around hub 731 through an angle that is at least 180°. Also, in the illustrated embodiments, platform 760 extends circumferentially around a majority of space between hub 731 and circumferential sidewall 736. In other embodiments, platform 760 may extend around hub 731 by a range that is different from that illustrated.

Figure 7A:
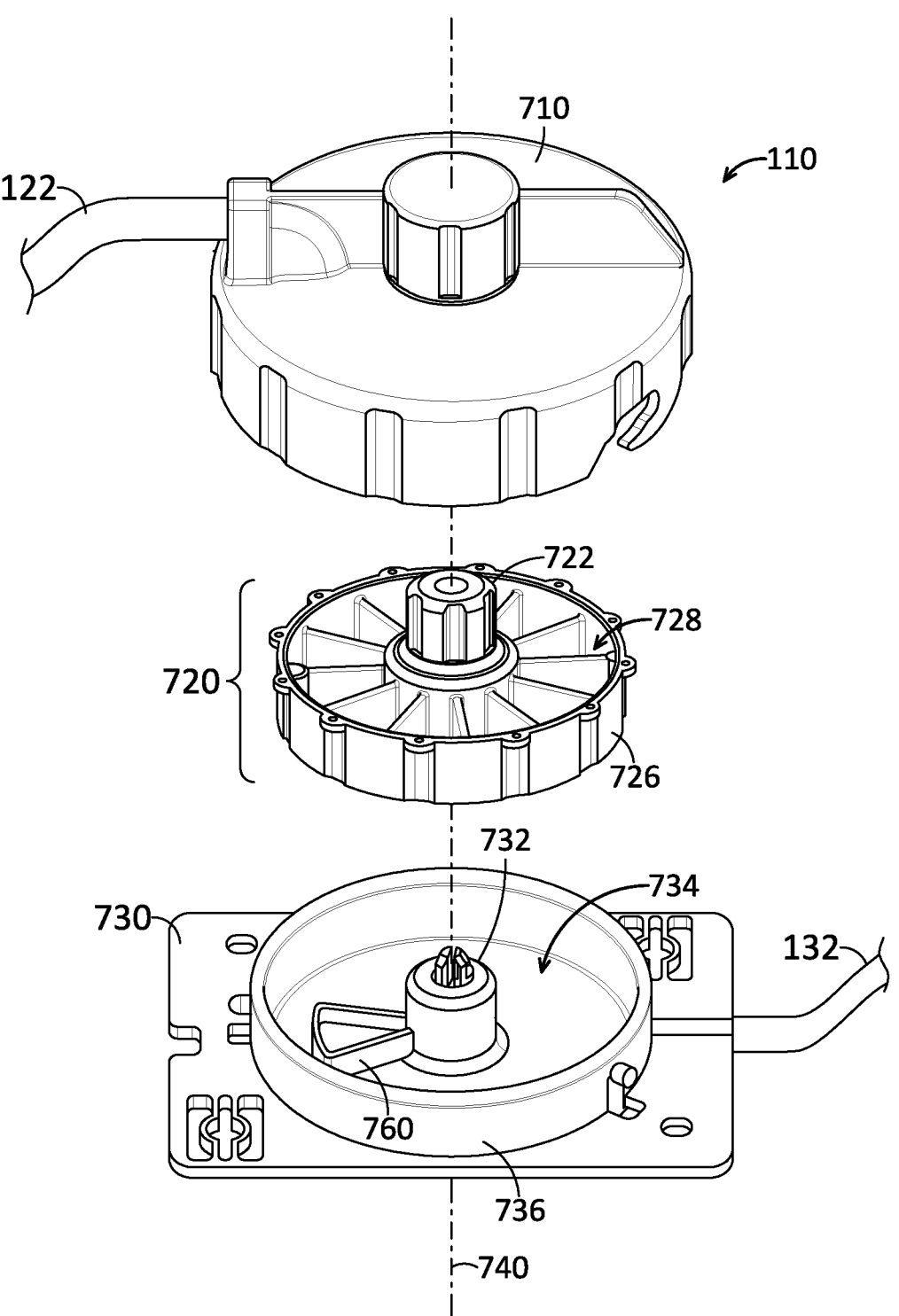
Figure 7B:
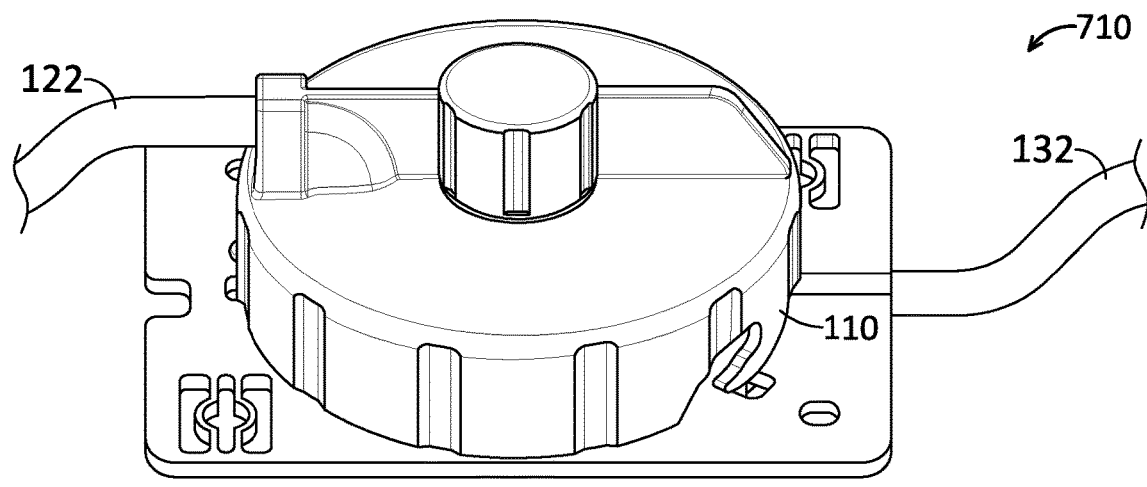
Figure 7C:
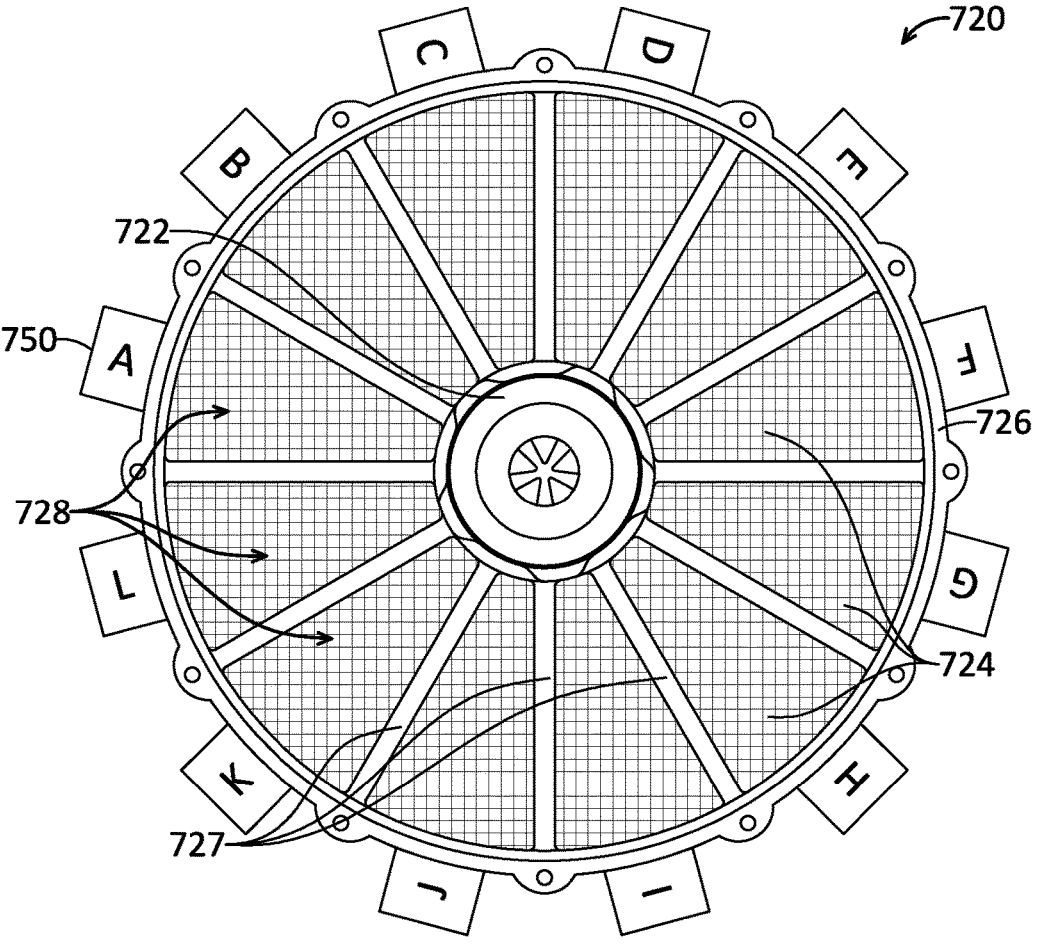
Figure 7D:
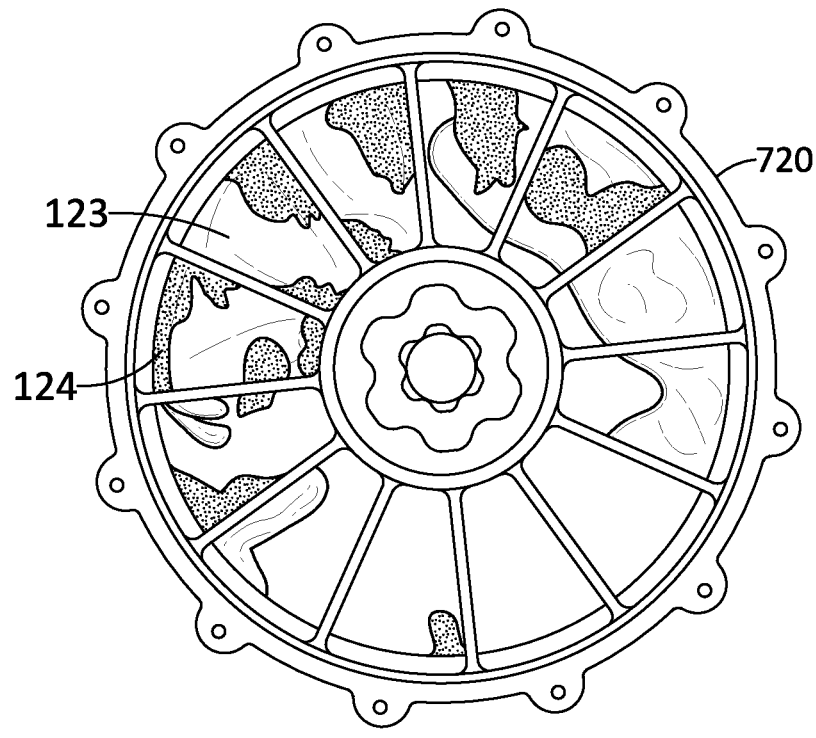
Figure 7E:
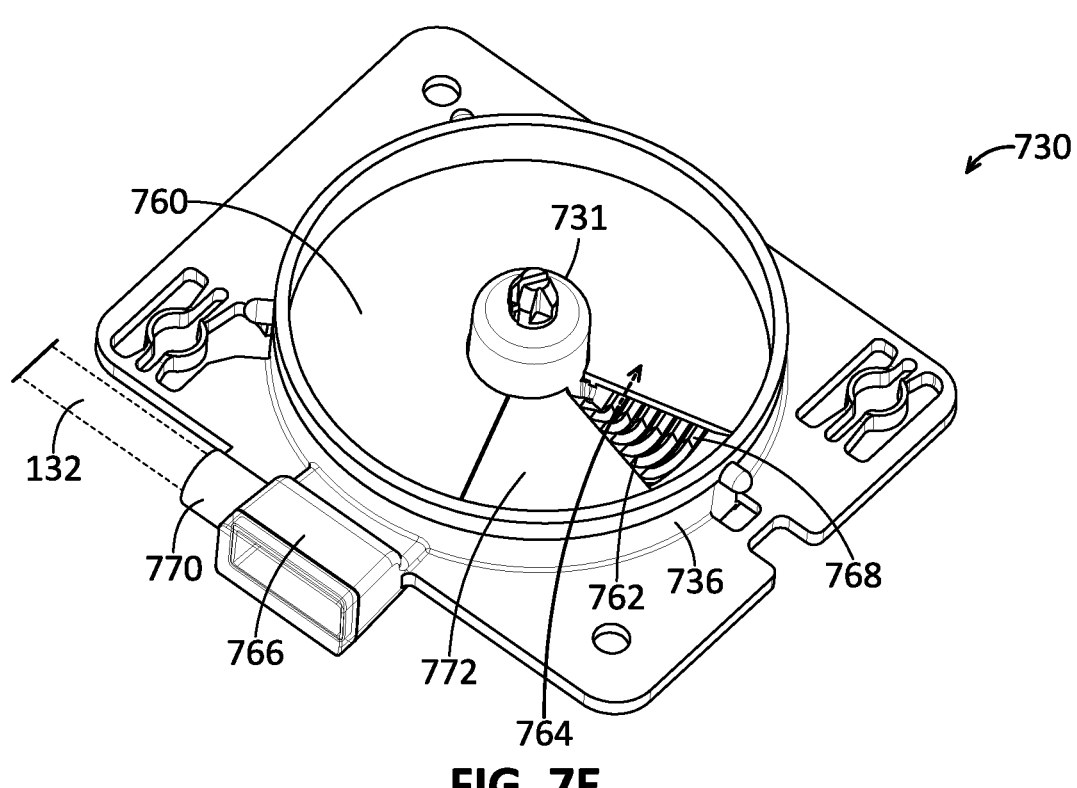

As shown in FIG. 7E, this embodiment of tissue filter assembly 110 also includes an imaging platform 772 that corresponds with an imaging position for imaging tissue specimens 123. An imager may be located under imaging platform 772. In particular, when tissue specimen 123 in specimen tray 720 is placed above imaging platform 772, imaging may be performed by imager underneath imaging platform 772 to image tissue specimen 123. In some embodiments, imaging platform 772 is a molded piece having solid walls that is raised above bottom surface 734 to prevent fluid from collecting in and around imaging area. During use, one of the tissue storage compartments 728 containing tissue specimen 123 to be imaged is placed above imaging platform 772. In some cases, filter or bottom surface 724 of specimen tray 720 may sit flush on imaging platform 772. It should be noted that imaging platform 772 is a separate piece from platform 766, and does not define any fluid channel.

Figure 7F:
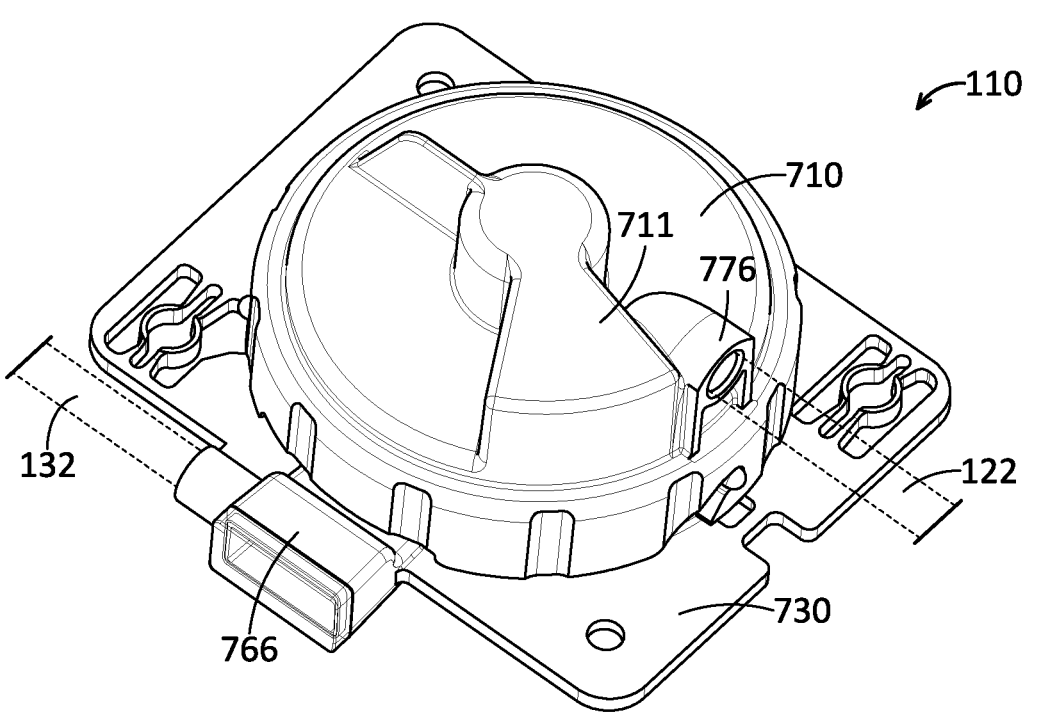

As shown in FIG. 7F, cover 710 also includes a raised portion 711 that defines a vaulted compartment corresponding to an imaging position of tissue specimens 123. In particular, when a tissue storage compartment 728 containing tissue specimen 123 is placed below raised portion 711 and above imaging platform surface 772, imaging may then be performed to image tissue specimen 123.

In some embodiments, platform opening 762, fluid channel 764, and flow comb 768 may be considered as parts of a fluid removal mechanism. Fluid removal mechanism is configured for removing fluid from bottom surface filter 734 underlying the bottom of a plurality of tissue storage compartments 728 in order to improve the quality of images acquired of tissue specimens 123 in tissue storage compartments 728. In other embodiments, the structures that participate in defining fluid channel 764 may also be considered to be parts of the fluid removal mechanism. For example, platform 760 above fluid channel 764 and/or a bottom member of base 730 below fluid channel 764 may be considered to be parts of fluid removal mechanism. In further embodiments, plenum 766 and/or suction line 132 may be considered to be parts of fluid removal mechanism.

Figure 7G:
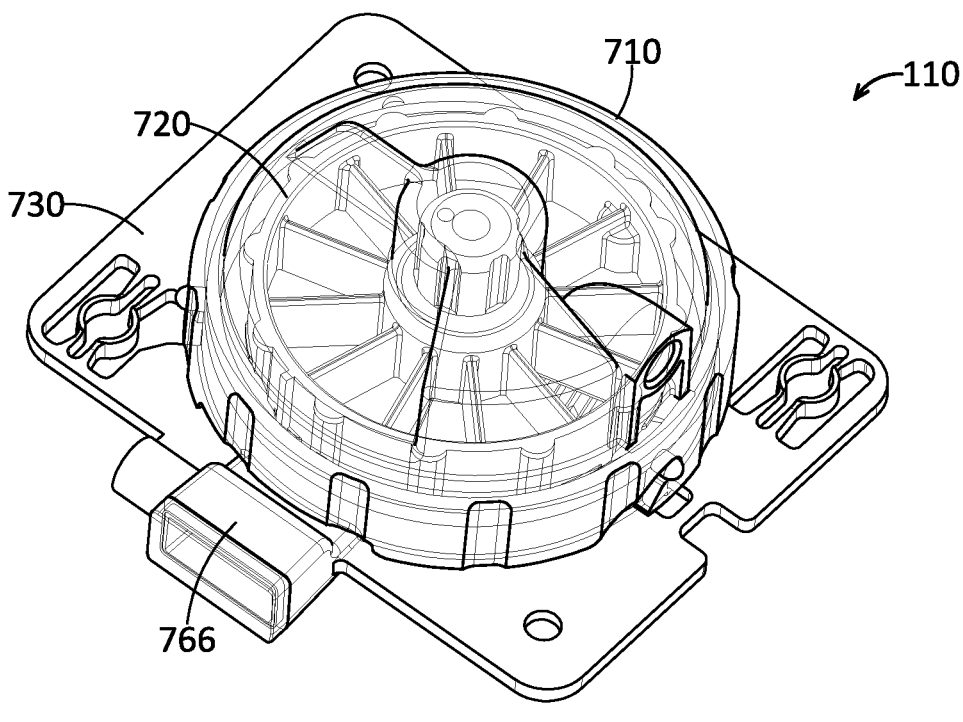

FIG. 7G illustrates a partial transparent view of tissue filter assembly 110. Cover 710 of tissue filter assembly 110 is illustrated as being partially transparent so that specimen tray 720 under cover 710 can be seen.

Figure 7H:
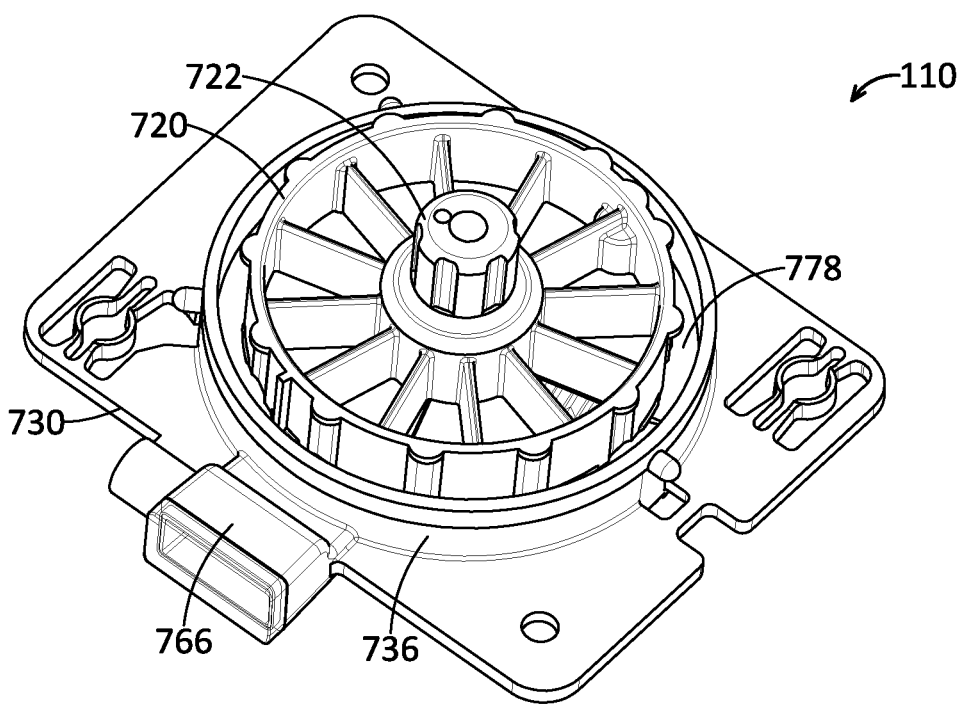

FIG. 7H illustrates tissue filter assembly 110 with cover 710 removed. Circumferential sidewall 736 of base 730 defines a space for accommodating specimen tray 720. When specimen tray 720 is rotatably coupled to base 730, specimen tray 720 is separated from circumferential sidewall 736 by a gap 776. This allows specimen tray 720 to rotate relative to base 730 without interference.

Figure 7I:
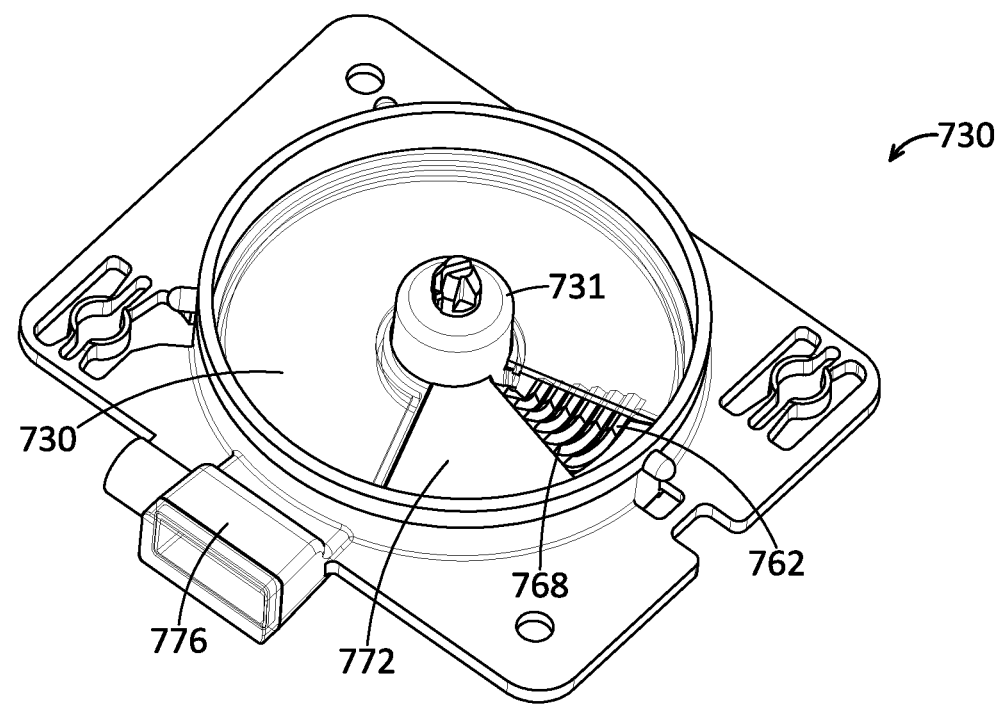

FIG. 7I illustrates base 730 of tissue filter assembly 110 with cover 710 and specimen tray 720 removed. As shown in FIG. 7I, platform 760 of base 730 of tissue filter assembly 10 is presented in a partial transparent format in order to illustrate a part of flow comb 768 underneath platform 760.

Figure 7J:
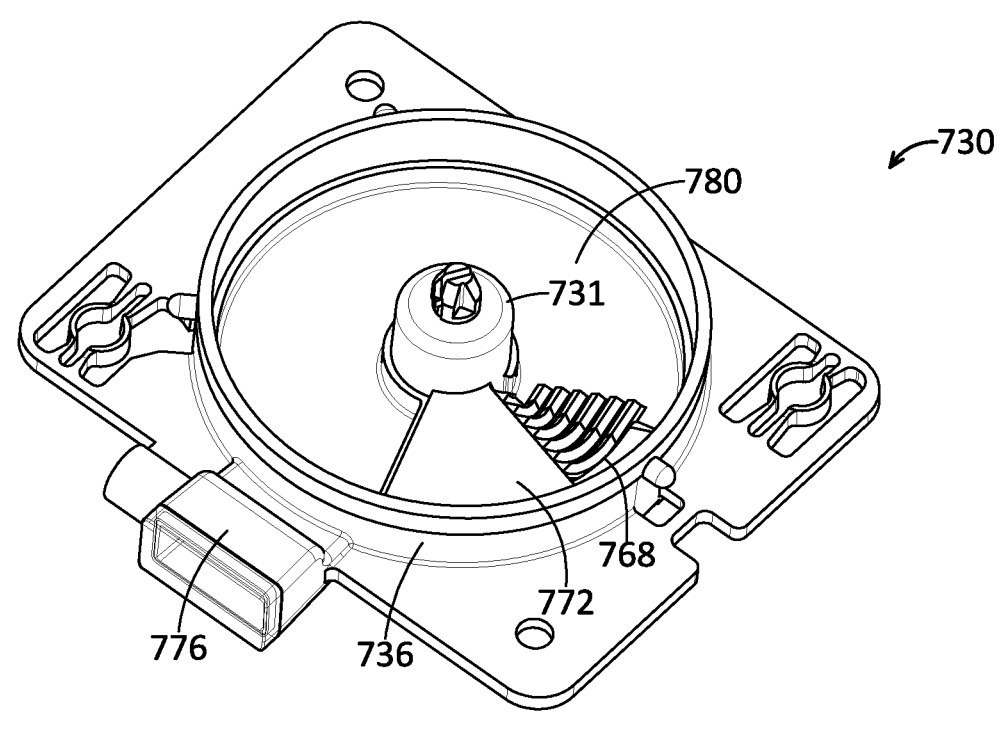

FIG. 7J illustrates base 730 of tissue filter assembly 110, in particular, platform 760 removed from base 730. Imaging platform 772 and the extent of flow comb 768 can be seen.

As shown in the figure, base 730 includes a bottom member 780 surrounded by circumferential sidewall 736 of base 730. Bottom member 780 has an elevation that is below that of flow comb 768. In some embodiments, imaging platform 772 and/or flow comb 768 may be molded together with bottom member 780. As shown in the figure, flow comb 768 has an arcuate shape, which allows fluid 124 to be transported along a curvilinear path from platform opening 762 into fluid channel 764. In the illustrated embodiments, flow comb 768 has six parallel flow channels. In other embodiments, flow comb 768 may have more than six parallel flow channels (e.g., seven, eight, nine channels, etc.), or fewer than six flow channels (e.g., five, four, three, two channel). In some cases, flow comb 768 may include at least four flow channels. Also, in the illustrated embodiments, flow comb 768 has a length that is longer than a dimension of platform opening 762 measured along a longitudinal axis of fluid channel 764. In other embodiments, flow comb 768 has a length that is shorter than, or the same as, a dimension of platform opening 762 measured along a longitudinal axis of fluid channel 764. Furthermore, in the illustrated embodiments, a first part of flow comb 768 adjacent platform opening 762 may have a first slope that is approximately vertical (e.g., 90°±20°), a second part of flow comb 768 following the first part may have a second slope that is approximately 45°±20°, and a third part of flow comb 768 following the second part and extending inside fluid channel 764 may have a third slope that is approximately 0°±20°. In other embodiments, flow comb 768 may have other sloping profiles. In some embodiments, surface treatment may be applied to flow comb 768 to assist in flow of fluid 124 over the flow comb 768. For example, in some embodiments, anti-coagulant coating, hydrophobic coating, or other treatments may be applied on the surface of flow combs 768.

Figure 7K:
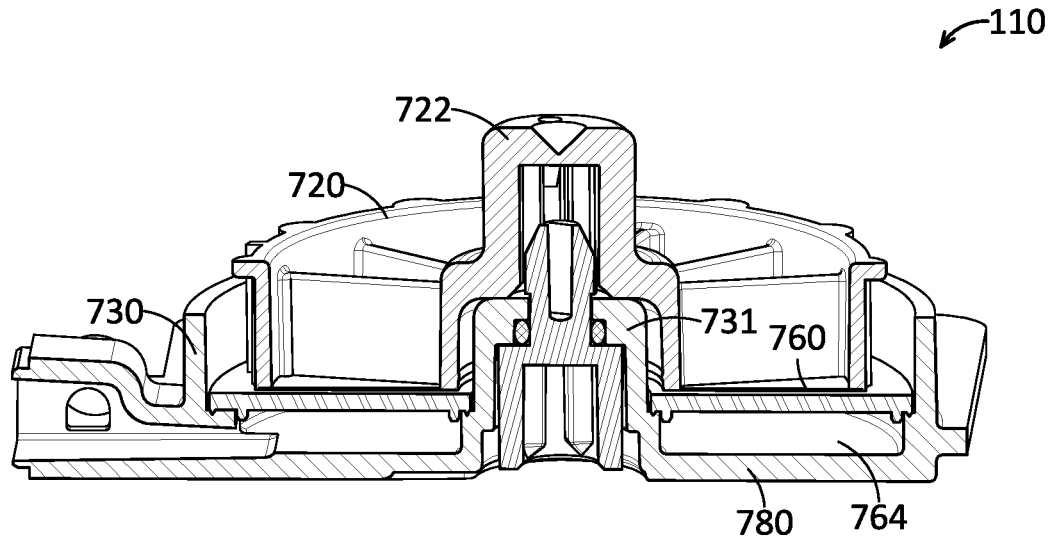

As shown in FIG. 7K, bottom member 780 and platform 760 together define fluid channel 764. Platform 760 and fluid channel 764 are located below specimen tray 720 when specimen tray 720 is coupled to base 730. Fluid channel 764 is configured to provide suction for transporting fluid 124 through fluid channel 764.

Figures 7L, 7M:
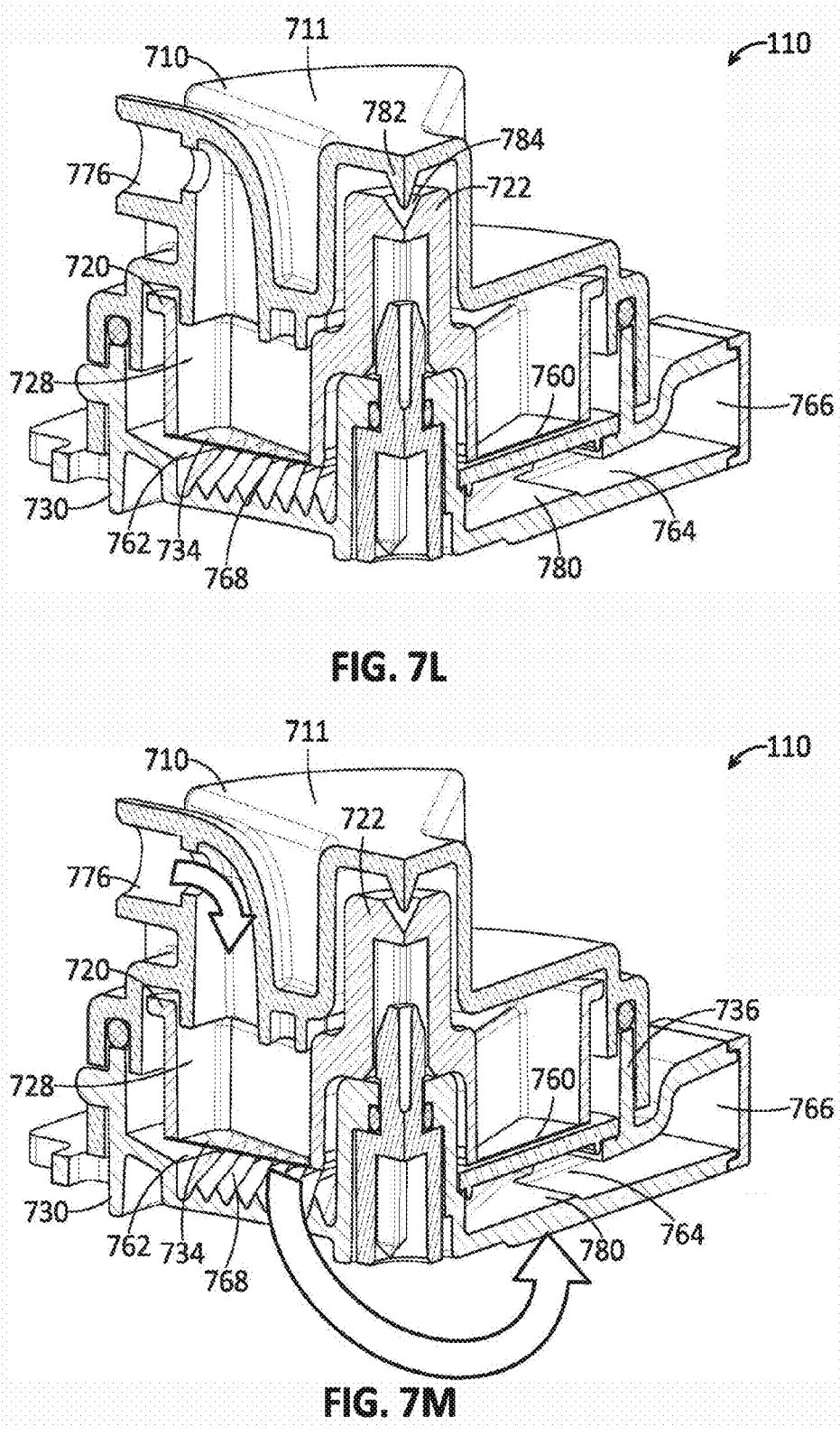

FIG. 7L illustrates a partial cut-away view of tissue filter assembly 110, particularly showing specimen tray 720 having been loaded inside the interior defined by base 730 and cover 710. Cover 710 includes a protrusion 782 configured to mate with an opening 784 at hub 722 of specimen tray 720. The lower part of hub 722 of specimen tray 720 has an opening for receiving hub 731 of base 730, and hub 722 includes a slot for receiving spindle 732 of base 730. Thus, rotation of spindle 732 will cause specimen tray 720 to rotate relative to base 730. Protrusion 782 from cover 110 and hub 731 of base 730 extend into hub 722 of specimen tray 720 from opposite directions, thereby stabilizing specimen tray 720 during rotation. Accordingly, specimen tray 720 is removably coupled to spindle 732 (drive member) at base 730 and configured to be selectively rotated thereby about an axis 140 that is substantially orthogonal (e.g. 90°±10°) with respect to bottom member 780.

As shown in FIG. 7L, inlet port 122 at cover 110 is radially aligned with a respective tissue storage compartments 728, and also radially aligned with the platform opening 762 formed at least partially with platform 760. Accordingly, when tissue specimen 123 with fluid 124 is delivered into inlet port 122, tissue specimen 123 and fluid 124 are deposited into respective tissue storage compartments 728. Tissue specimen 123 is contained by bottom surface filter 734 while fluid 124 exits through bottom surface filter 734 and through platform opening 762 of platform 760. During use of tissue filter assembly 110, suction will be provided inside of fluid channel 764 to help draw fluid 124 from the bottom of specimen tray 720 and into platform opening 762.

FIG. 7M illustrates a partial cut-away view of tissue filter assembly 110 of FIG. 7L, particularly showing fluid flow direction. As shown, a tissue specimen 123 and fluid 124 from biopsy device 120 enter into tissue filter assembly 110 via inlet port 122. Tissue specimen 123 is deposited into one of the tissue storage compartments 728 in specimen tray 720. Bottom surface filter 734 prevents tissue specimen 123 from exiting through bottom of specimen tray 720 while allowing fluid 124 to pass therethrough. Due to suction provided in fluid channel 764, fluid 124 enters into platform opening 762 at platform 760, and is broken up by flow comb 768 inside of fluid channel 764. Fluid 124 is then transported, due to suction force inside fluid channel 764, through fluid channel 764, and exits via exit port 97 at circumferential sidewall 746 into plenum 766. Plenum 766 allows a certain amount of fluid 124 to be collected while fluid 124 is being suctioned out of plenum 766 via outlet port into suction line 132.

While various tissue filter assembly 100 configurations have been described with reference to FIGS. 7A-D and FIGS. 7E-M, it will be understood that embodiments may involve or utilize various tissue filter assembly 100 configurations including those with particularly configured mechanical fluid management devices 760 as described with reference to FIGS. 7E-M to reduce the amount of fluid 124 that is imaged. Thus, certain fluid management devices 760 are described herein as non-limiting examples how fluids 124 that are subjected to image processing can be reduced and removed from a tissue storage compartment 728. It will also be understood that embodiments may not involve mechanical fluid management devices 760.

Having described various aspects, structures and operation of an exemplary tissue biopsy system 100 and components thereof that can be utilized in conjunction with embodiments of processing X-ray images 150 of tissue specimens 123 to generate a modified X-ray image 150m, image processing embodiments described with reference to FIGS. 1-3 are described in further detail with reference to FIGS. 8-11 and the exemplary biopsy system 100 described above with reference to FIGS. 4A-7M.

Referring to FIG. 8, which illustrates a method 800 for modifying an X-ray image of a tissue specimen, one embodiment of image processor 160 of tissue biopsy system 100 is configured or operable for selective X-ray image modification by execution of an imaging algorithm including a plurality image masks 170 based on a structural or geometric configuration 171 of at least a portion of a specimen tray 720 that was imaged and depicted in X-ray image 150.

At 802, a structural or geometrical configuration 171 or template of specimen tray 720 is received or determined and stored by image processor 160 for subsequent access. Structural or geometrical configuration 171 may include geometric data of tissue storage compartments 728, sidewalls 726 and inner dividing walls 727. Sidewall 726, dividing wall 727 and tissue specimen 123 boundaries within tissue storage compartment 728, whether placed in a middle of a tissue storage compartment 728 or in contact with a wall, can be determined with structural or geometric configuration data 171 including one or more or all of component dimensions, centers, rotation centers, and radii of curvature for various components. Structural or geometrical configuration 171 or template may also account for other objects embedded within or affixed to specimen tray 720, such as geometric data of pre-determined printed indicia 750 and a magnet or compartment "zero" position object. Structural or geometric configuration 171 data may include, for example, mass center of printed indicia 750, the location of magnet relative to storage compartments 728, the size or dimensions of indicia 750 and a magnet, a center thereof, and a radius thereof as applicable. While printed indicia and magnets are provided as examples of such objects, other objects and image data thereof may be processed depending on specimen tray 720 configurations and processing.

Figure 9:
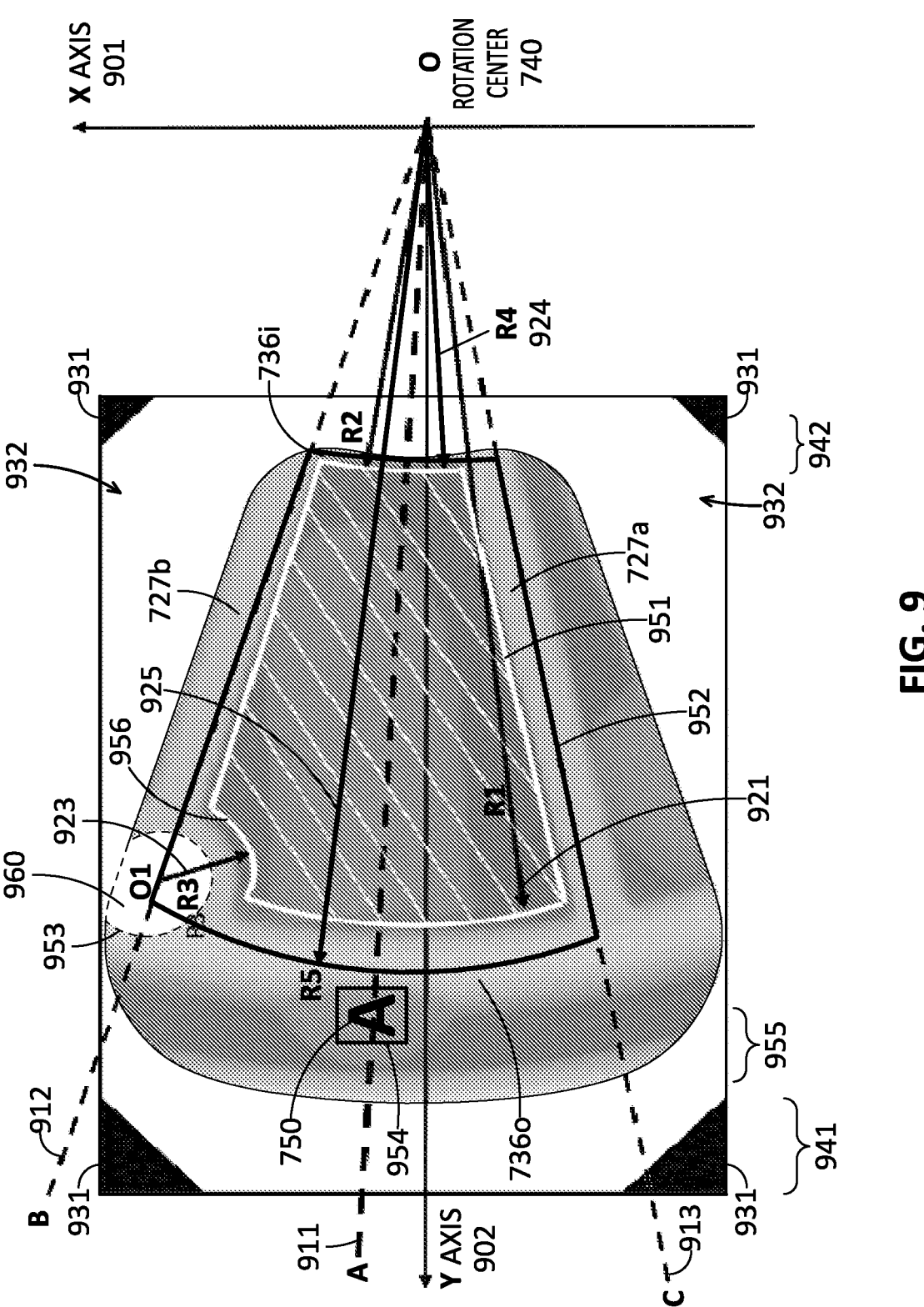
FIG. 9 illustrates an example of how a structural or geometric configuration of at least a portion of a specimen tray applies to an X-ray image.

With the exemplary tissue biopsy systems 100 described above, a single magnet may be sufficient for magnetically driven rotation of specimen tray 720, and such magnet may be positioned between or adjacent to a compartment 728 with printed indicia "A" (where magnet of specimen tray 720 is imaged as brightest portion in FIG. 9) and a compartment 728 with printed indicia "L" as an example. The magnet may not only serve to rotation specimen tray 720, but also as a compartment "zero" or reference marker. Thus, it will be understood that one or more storage compartments 728 may be adjacent to a magnet, whereas other storage compartments 728 are not.

At 804, tissue biopsy system 100 is activated and utilized to sever tissue specimen 123. For example, as described above with reference to FIG. 6, this may involve insertion of biopsy needle 622 into a patient and biopsy needle 622 being attached to a driver of the biopsy excision tool 120 for tissue extraction.

At 806, severed tissue specimen 123 is delivered via suction through lumen of inlet line 122 and deposited into storage compartment 728 of specimen tray 720 of tissue filter assembly 110. For example, as described above with reference to FIG. 6, proximal end of biopsy excision tool 120 is in communication with a saline/aspiration tubing assembly 610 comprising inlet line 122 for delivery of saline fluid 124 and delivery of fluid to filter assembly 110, and tissue specimen 123 excised by needle 622 of biopsy excision tool 120 is aspirated together with fluid 124 through suction line 612 that is in communication with an inlet into filter assembly 110 to deposit severed tissue specimen 123 and fluid 124 into storage compartment 128.

Continuing with reference to FIG. 8, at 808, X-ray imaging device 141 is activated to acquire X-ray image 150 of tissue specimen 123 in storage compartment 728 and at least a portion of specimen tray 720. X-ray image 150 is stored and/or provided to image processor 160.

FIG. 9 illustrates an exemplary X-ray image 150 of a portion of specimen tray 720 including storage compartment 728. While FIG. 9 is an X-ray image 150 rather than an actual specimen tray 720, reference numbers of specimen tray 720 and other structures are provided in FIG. 9 for reference to identify physical structures of specimen tray 720 depicted in X-ray image 150.

In the illustrated example, X-ray image 150 includes one complete specimen compartment 728 defined by arcuate, cylindrical or circumferential outer sidewall 736o ("o" referring to "outer," generally, outer sidewall 736o), an arcuate, cylindrical or circumferential inner sidewall 736i ("i" referring to "inner," generally inner sidewall 736i), and inner dividing walls 727a-b. Tissue specimen (not shown) is deposited into storage compartment 728 and imaged by X-ray imaging device 141.

FIG. 9 further illustrates X-ray image 150 as generated by X-ray imaging device 141 relative to a pre-determined structural or geometric framework 171 including rotation point or rotation center (0) or axis 740 and associated x axis

901 and y axis 902. FIG. 9 further illustrates how specimen tray 720 and compartment 728 structure depicted in X-ray image 150 are expressed relative to different references and radii such as rotation center (0) or axis 740, x axis 901 and y axis 902.

In particular, Line OA 911 extends from rotation center (0) or axis 740 through center of printed indicia or landmark 750 to represent or approximate a lengthwise center line of storage compartment 728. Exemplary X-ray image 150 is an image of specimen tray 720 defining 12 tissue storage compartments (A-L), with only one complete storage compartment 728 included in X-ray image 150 and identified by printed indicia 750 "A." However, it will be understood that embodiments are not so limited and that X-ray image 150 is provided as an example to describe how embodiments may be implemented. FIG. 9 also illustrates an example in which X-ray image 150 is not in proper rotational alignment. Line O-A 911 is displaced in a clockwise direction relative to Y axis 902. In other words, Line O-A 911 through printed indicial 750 "A" is not coincident with Y axis 902.

Line OB 912 extends from rotation center (0) or axis 740 and through an approximate center of dividing wall 727b. Line OC 913 extends from rotation center (0) or axis 740 and through an approximate center of dividing wall 727a. Thus, Lines OB 912 and OC 913 effectively split imaged dividing walls 727b, 727c into two image sections—an "inner" wall section or inner wall that defines at least a portion of storage compartment 728, and an "outer" wall section or outer wall. Arcuate sidewalls 736i,o in X-ray image 150 may also be similarly divided into "inner" and "outer" portions as described in further detail below, but based on other structural criteria besides Lines OB and OC 912, 913. As described in further detail below, imaging algorithm, according to certain embodiments, utilizes this virtual splitting of specimen tray walls 727 to generate modified X-ray image 150m.

FIG. 9 also illustrates different radius and curvatures relative to rotation center (0) or axis 740 including Radius R1 921 representing a virtual radius of outer sidewall 736o from axis 740, Radius R2 922 representing a virtual radius of inner sidewall 736i from axis 740, Radius R3 923 representing a virtual radius of a wall 736m ("m" referring to magnet) relative to axis 740, and Radius R4 924 and Radius R5 925 representing respective virtual radii of respective boundaries of imaging mask 170 described in further detail below.

X-ray image 150 of FIG. 9 also includes dark corner areas 931 and a surrounding light area 932 resulting from imaging a portion of collimator 142 of X-ray imaging device 141 that was in the field of view when X-ray image 150 was acquired.

Referring to again to FIG. 8, at 810, image processor 160 executes an imaging mask 170 of a ROI mask to remove image portions 931 and 932, e.g., using segmentation or other image processing or filter suitable for radiopaque/metal objects.

Continuing with reference to FIGS. 8 and 9, at 812, image processor 160 identifies a registration and/or orientation reference for determining whether X-ray image 150 is in proper lateral and/or rotational alignment for correspondence to known structural or geometric structure 171 of imaged specimen tray 720. Registration and/or orientation references may include, for example, x axis 901, y axis 902, and rotation center (0) 740. At 814, image processor 160 identifies printed indicia or landmark 750 (e.g., printed "A") associated with storage compartment 728 of specimen tray 720. Printed indicia or landmark 750 may be a pre-determined letter, shape or indicator (e.g., from Letters "A" to "L") so that this limited set of pre-determined characters is identifiable by character recognition or selectable by user via UI 182 as indicia 750 for a compartment 728. At 816, having identified or received selection of indicia or landmark 750, image processor 160 determines the center, e.g., mass center, of printed indicia 750, which in the illustrated embodiment, is also identified by Line OA 911. Line OA 911 represents an estimated lengthwise central line of compartment 728.

At 818, embodiments determine whether rotational misalignment adjustments are required. This may be done by rotating X-ray image 150 as needed based on step 816 to correct rotational positioning of X-ray image 150. For example, in the illustrated example, X-ray image 150 is not in proper rotational alignment as a result of Line O-A 911 being rotated in a clockwise direction relative to Y axis 902. In other words, Line O-A 911 is rotationally displaced since it is not coincident with Y axis 902. In this case, X-ray image 150 is rotated until Line O-A 911 is in alignment or coincident with Y axis 902. X-ray image 150 may already be in proper rotational alignment such that no rotational adjustment is needed. Further, in other embodiments, to adapt to rotational misalignment, X-ray image orientation may remain as imaged and embodiments can instead rotate or reposition image masks 170 and structural or geometric configuration 171 as described in further detail below. Rotational adjustments, whether of X-ray image 150 and/or image masks 170 and structural or geometric configuration 171, may be clockwise or counter-clockwise.

Continuing with reference to FIGS. 8 and 9, at 820, image processor 160 determines X-ray collimator offsets 941, 942 within X-ray image 160, for example, left collimator offset 941 relative to outer edge of outer sidewall 736*o* and right collimator offset relative to outer edge of inner sidewall 736*i*. In the illustrated example, left collimator offset 941 is larger than right collimator offset 942. X-ray image 150 can be translated at 822 to center so that X-ray image 150 depicting specimen tray 720 or portion thereof corresponds with a known structural or geometric configuration 171 of the specimen tray 720 or portion thereof. There may be cases where X-ray image 150 is already properly centered and no offset adjustment is needed. Further, in other embodiments, to adapt to collimator offsets, X-ray image position may remain as imaged and embodiments can instead reposition image masks 170 and structural or geometric configuration 171. Thus, embodiments can adapt to manufacturing imperfections and collimator offsets during imaging, whether such imperfections result in rotational and/or offset adjustments.

Thus, after any rotational and/or offset adjustments, X-ray image 150 of specimen tray 720 or portion thereof corresponds to the known structural or geometric configuration 171 of the actual specimen tray 720 or portion thereof. Image masks 170, based on structural or geometric configuration 170, are ready for execution on X-ray image 150.

At 824, image processor 160 executes imaging algorithm including a compartment mask 951, which is executed on a portion of X-ray image 150 depicting an internal area of storage compartment 728. Compartment mask 951 substantially conforms to a contour of the interior of the storage compartment 728 defined by a plurality of walls of specimen tray 720, which in the illustrated embodiment, includes dividing walls 727 and arcuate sidewalls 736 and arcuate wall portion 956 (resulting from imaging of a magnet 953). Different magnet shapes will result in different image 953 profiles so that the shape of wall portion 956 will reflect such shapes. Moreover, in the absence of a magnet, outer side wall 936*o* would extend between dividing walls 727*a,b* without wall portion 956 resulting from magnet imaging.

Accordingly, it will be understood that FIG. 9 is provided for purposes of illustration, not limitation.

Compartment mask 951 enhances at least one of a brightness and a contrast of pixels of X-ray image 150 depicting tissue specimen 123 within boundary of compartment mask 951. In the illustrated embodiment and the depicted specimen tray 720 configuration, boundary of compartment mask 951 includes a pair of linear boundary sections and a pair of arcuate boundary sections extending between the linear boundary sections and an arcuate section following contour of wall section 956 adjacent to portion of X-ray image of imaged magnet. It will be understood that compartment mask 951 boundary may be different shapes depending on the shape of a tissue storage compartment 728 such that the linear/arcuate configuration shown in figures and described herein is provided for purpose of illustration and explanation, not limitation. In this manner, compartment mask 951 boundary is contained within interior of storage compartment 728 and excludes dividing walls 727*a-b*, excludes sidewalls 736*i*, 736*o*, as well as wall portion 56. Compartment mask 951 boundary also excludes results or dark areas 931 and areas 932 as a result of X-ray collimator 142 being within field of view, positioning magnet of specimen tray 720 and other objects outside of storage compartment 728.

In the illustrated embodiment of FIG. 9 in which X-ray image 150 includes an imaged magnet, the wall structure and shape of compartment mask 951 changes compared to when adjacent storage compartments 728 do not have a magnet and no magnet is imaged. In either case, compartment mask 951 substantially follows an inner contour of compartment 728, and with an imaged magnet as illustrated, includes a first linear boundary section, a second linear boundary section, a first arcuate boundary section, a second arcuate boundary section and a third arcuate boundary section. First arcuate boundary section of compartment mask 951 extends between the first linear boundary section and the second linear boundary section, second arcuate boundary section of the compartment mask extends between the first linear boundary section and the third arcuate boundary section and third boundary section of the compartment mask extends between the second arcuate boundary section and the second linear boundary section. In the embodiment illustrated in FIG. 9, radius of curvature of the third arcuate section of compartment mask 951 adjacent to arcuate wall portion 956 is smaller than respective radii of curvature of respective first and second arcuate boundaries of compartment mask 951 and other masks due to curvature around imaged area of magnet.

Continuing with reference to FIGS. 8 and 9, at 826, image processor 160 executes imaging algorithm including partial structure mask 952 on a portion of X-ray image 150 that depicts respective walls (inner walls 727 and outer/inner side walls 736*i*, 736*o*) of specimen tray 720 and storage compartment 728. Boundary of partial structure mask 952 extends around compartment mask 951 or encompasses compartment mask 951.

Boundary of partial structure mask 952 extends along respective lengths of, and partially through, respective walls 727, 736 of specimen tray 720 to capture respective inner wall sections of respective walls of specimen tray 720 and a remaining portion of storage compartment 728 that is beyond the boundary of specimen image mask 951. Thus, partial structure mask 952 is applied to a portion of X-ray image 150 depicting specimen wall structure determined, for example, based on image portions inside of Lines O-B 912 and O-C 913 or based on a pre-determined distance from boundary of compartment mask 951. Partial structure mask 952 is executed to mask out image portions or reduce at least one of a brightness and a contrast of pixels of the X-ray image 150 depicting outer portions of respective specimen tray walls 727a,b and 736i,o thereby leaving only an inner portion of specimen tray walls 727a, b and 736i,o. In other words, partial structure mask 952 cuts the thickness of walls, e.g., keeping 25%, 33% or 50% of the thickness of a wall, whereas the other wall portion that is processed by reducing brightness and/or contrast thereof.

In this manner, in an X-ray image 150 that does not include an imaged magnet, boundary of partial structure mask 952, similar to boundary of compartment mask 951 to include a pair of linear boundary sections and a pair of arcuate boundary sections extending between the linear boundary sections such that partial structure mask can be substantially the same shape as, but encompassing, compartment mask 951. In an X-ray image 150 including a portion for an imaged magnet, as shown in FIG. 9, compartment mask 951 and partial structure mask 952 may have different shapes due to compartment mask 951 including additional curvature as a result of the imaged magnet and resulting wall portion 956. Further, with an imaged magnet, as shown in FIG. 9, a portion of partial structure mask 952 may extend through a portion of X-ray image 150 that was generated by imaging of a magnet or other extraneous object, or in other embodiments, follow the curvature of compartment mask 951 through wall portion 956 so that both compartment mask 951 and partial structure mask have similar shapes.

At 828, image processor 160 identifies or receives user selection of X-ray image 150 portions for "extraneous" objects that are located outside of storage compartment 728 area, such as a magnet and printed indicia. At 830, image processor 160 identifies respective extraneous object image masks 953, 954 for respective identified objects and executes extraneous object image masks 953, 954. A portion of X-ray image 150 generated by imaging a metal magnet may be a bright spot 960 or high attenuation object as depicted in FIG. 9, in which case a metal mask 953 for same would substantially reduce at least one of brightness and contrast of the X-ray image 150 or delete this area and fill with pixel values of adjacent image areas. Other objects may be processed differently. For example, it is desirable to maintain imaged printed indicia 750 such that the object mask 954 for these indicia objects selects a ROI that includes the printed indicia 750 to be included in modified X-ray image 150m. Such character objects can be identified by a user via UI 182 or via character recognition. Thus, portions of X-ray image 150 for different types of extraneous objects may be processed with different types of extraneous object masks 953, 954 that deemphasize or delete a portion of an X-ray image 150, or maintain and/or enhance a portion of X-ray image 150.

At 832, image processor 160 executes background image mask 955 on other portions of X-ray image 150 depicting other areas of specimen tray 420. This may involve, for example, other plastic specimen tray structures or plastic structures utilized for fluid management and that are located outside of partial structure mask 952 or between partial structure mask 952 boundary and ROI mask boundary. These background structures, which may include various added structures for enhanced fluid management control, can be masked out or deemphasized.

At 834, image processor 160 determines contrast and/or brightness adjustments to adapt pixel values to respective thicknesses of tissue specimen 123. Statistical analysis of portions of X-ray image 150 depicting tissue specimen 123 can be analyzed with statistical analysis, such as one or more of mean value, standard deviation and thresholding, to identify portions of the X-ray image 150 depicting a thinner part of the specimen 123 in contrast to a thicker part of the specimen 123 such that pixel adjustments can be made based on different specimen thicknesses, e.g., brightness values of pixels for thinner and thicker specimen 132 portions are enhanced with respective brightness and contrast so that specimen edges, of both thinner and thicker specimen 132 portions, can be delineated while the thicker specimen 132 portion is not too bright. Thus, pixel values can be selectively adapted across specimen 123 thicknesses.

At 836, a modified X-ray image 150m is generated based on respective results of executing various image masks 170 or based on respective results of executing various image masks 170 and specimen thickness adaptation.

Figures 10A, 10B:
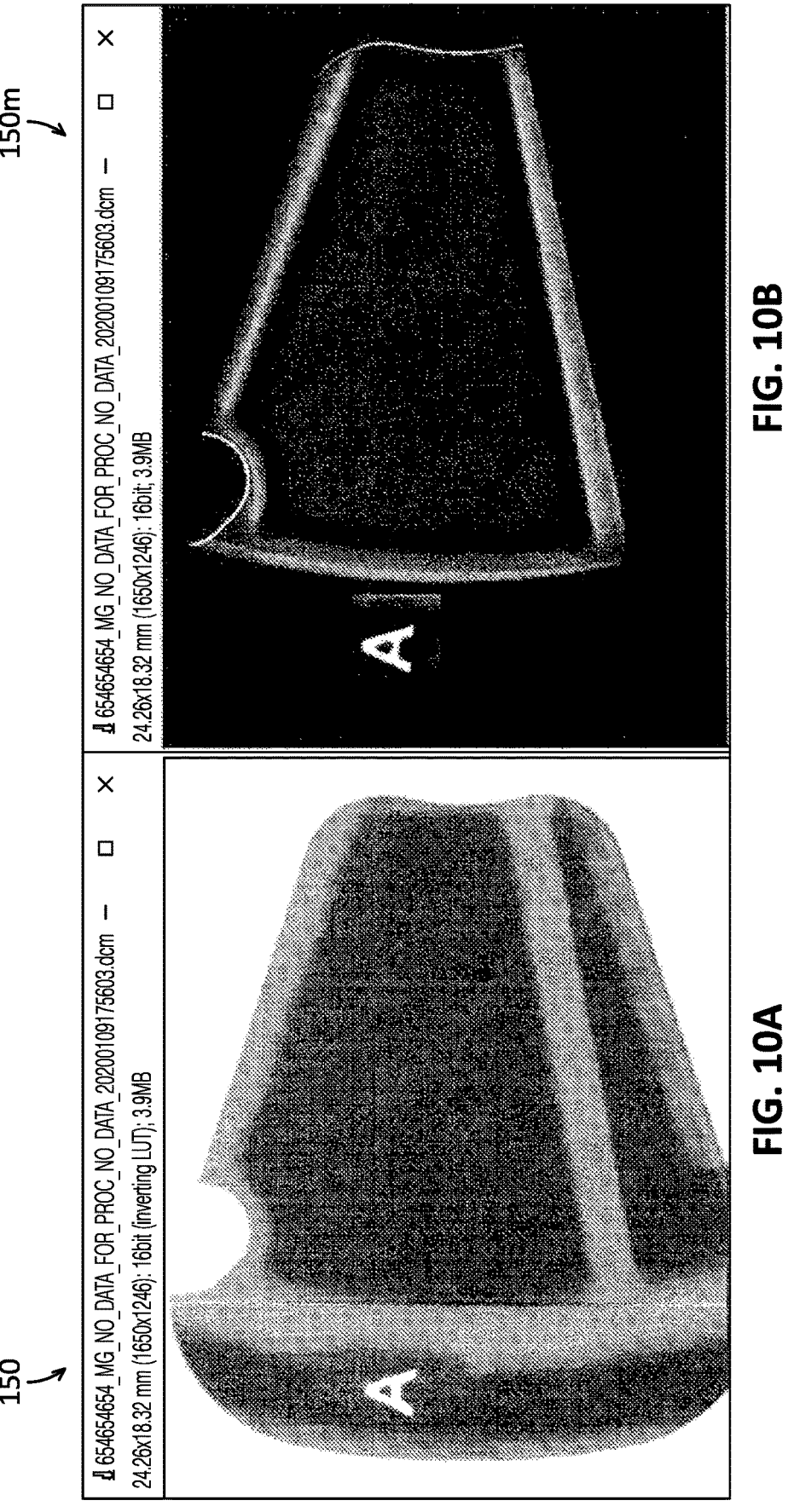

FIG. 10A is a ray X-ray image 150 generated by the X-ray imaging device 141 (before being processed with embodiments) and depicts a magnet (imaged as high attenuation/ bright spot). FIG. 10B is a modified X-ray image 150m generated according to embodiments.

As can be seen by comparing FIG. 10A (raw X-ray image 150) and FIG. 10B (modified X-ray image 150m generated by embodiments), modified X-ray image 150m generated according to embodiments is cleaner, smaller and more focused, and includes more consistent or flatter brightness profile or less brightness variance. Modified X-ray image 150m does not include bright, high attenuation image portions (e.g., resulting from imaging a metal magnet or plastic portions of specimen tray 720). Embodiments also deemphasize or eliminate image portions for additional tray structure, e.g., additional plastic structure used for fluid management in tissue filter assemblies 100 described above with reference to FIGS. 7E-M. Modified X-ray image 150m of FIG. 10B is significantly more pleasing to the eye with substantially reduced distractive elements. Modified X-ray image 150m generated according to embodiments is less distracting than an X-ray image 150 shown in FIG. 10A and are less likely to contribute to eye fatigue while providing a more productive and efficient review experience.

FIGS. 11A-B provide another example of a modified X-ray image 150m generated according to embodiments for a different tissue storage compartment 728 (identified by printed indicia "G") that is not adjacent to a magnet and that includes a tissue specimen 123 deposited therein. Similar advantages of modified X-ray image 150m in FIG. 11B relative to a raw X-ray image 150 as shown in FIG. 11A are visually apparent including deemphasizing or eliminating image portions for other plastic specimen tray areas while enhancing a tissue specimen 123 within a tissue storage compartment 728.

Referring again to FIG. 8, at 838, modified X-ray image 150m pixel data is incorporated into a Digital Imaging and Communication in Medicine (DICOM) object, which may be exported for display to a user at 840 or communicated to another system or via a network.

Thus, as described above, embodiments provide for improved tissue specimen imaging and enhanced X-ray images that selective emphasize certain image portions while eliminating or deemphasizing other image portions by use of selective image masking based on a structural or geometric configuration of the imaged specimen tray. Embodiments achieve these significant imaging improvements, in tissue image processing, which may be in real time during a biopsy procedure or after the biopsy procedure, such that improved imaging results can be presented to the operator who can make a more accurate and efficient analysis and determine, for example, whether additional tissue specimens should be acquired. Embodiments are also adaptable to various system components configurations and tissue specimens and biopsy procedures, one example of which is a breast biopsy procedure.

Although particular embodiments of the disclosed inventions have been shown and described, it is to be understood that the above description is provided for purposes of explanation and illustration only. Thus, various changes and modifications may be made without departing from the scope of the disclosed inventions.

For example, not all of the components depicted and described in the disclosed embodiments are necessary to implement embodiments, and various additional embodiments of the disclosed inventions may include suitable combinations of the described components, including different numbers and combinations of imaging masks.

Further, while embodiments have described tissue filter assemblies, specimen trays and associated imaging masks having certain shapes (with linear and/or curved/arcuate walls), it will be understood that embodiments are not so limited, and that embodiments may involve specimen trays with different configurations and compartment configurations and image masks with different respective shapes for different configurations, which may include different combinations of linear and curved/arcuate walls and/or other shaped walls for other specimen storage compartment shapes and specimen tray configurations.

Embodiments may be executed to generate modified X-ray images that mask our or deemphasize different portions of tissue filter assemblies and specimen trays depending on the particular structural configuration utilized. For example, embodiments may be executed to mask our or deemphasize additional plastic or other materials structures that are added for fluid management as described with reference to FIGS. 7E-M, and tissue filter assemblies may include different fluid management structures.

While the systems and methods have been described with reference to imaging of breast tissue samples acquired during a biopsy procedure, embodiments can also be configured and utilized with other types of tissue specimens.

Further, while imaging algorithms have been described with respective to various imaging masks, embodiments may involve some or all of these masks and different combinations thereof, which may be executed in different sequences.

Accordingly, embodiments are intended to exemplify alternatives, modifications, and equivalents that may fall within the scope of the claims.

The invention claimed is:

1. A computer-implemented method executed by a biopsy tissue handling apparatus, the computer-implemented method comprising:

acquiring, by an X-ray imaging system of the biopsy tissue handling apparatus, an X-ray image of a tissue specimen in a storage compartment defined by a plurality of walls of a specimen tray;

generating, by an image processor in communication with the X-ray imaging system, a modified X-ray image, wherein the modified X-ray image is generated by executing a plurality of image masks based at least in part on a geometric configuration of at least a portion of the specimen tray including the storage compartment with the tissue specimen depicted in the X-ray image, and wherein generating the modified X-ray image comprises:

enhancing a portion of the X-ray image depicting the tissue specimen via a compartment mask executed on a portion of the X-ray image depicting the storage compartment including the tissue specimen, a boundary of the compartment mask substantially corresponding to a contour of an interior of the storage compartment defined by the plurality of walls of the specimen tray within the X-ray image, and masking or reducing a portion of the X-ray image depicting outer portions of at least one of the plurality of walls of the specimen tray via a partial structure mask executed on a portion of the X-ray image depicting respective walls of the storage compartment of the specimen tray, a boundary of the partial structure mask extending along respective lengths and partially through the respective walls of the storage compartment of the specimen tray within the X-ray image, wherein the outer portions of the at least one of the plurality of walls being masked or reduced are outside of the boundary of the partial structure mask, and wherein the boundary of the partial structure mask encompasses the boundary of the compartment mask.

2. The method of claim 1, wherein the compartment mask enhances at least one of a brightness and a contrast of pixels of the X-ray image depicting the tissue specimen.

3. The method of claim 1, wherein the compartment mask excludes at least a portion of the plurality of walls of the storage compartment, imaged portions of a collimator of the X-ray imaging system, and a magnet used to rotate the specimen tray about an axis.

4. The method of claim 1, wherein the boundary of the partial structure mask is based on a pre-determined distance from the boundary of the compartment mask.

5. The method of claim 1, wherein the partial structure mask is executed to mask out or reduce at least one of a brightness and a contrast of pixels of the X-ray image depicting the outer portions of respective plastic walls of the specimen tray outside of the boundary of the partial structure mask.

6. The method of claim 1, wherein the boundary of the partial structure mask and the boundary of the compartment mask have substantially similar shapes.

7. The method of claim 6, wherein the boundary of the compartment mask includes a pair of linear boundary sections and a pair of arcuate boundary sections extending between the pair of linear boundary sections.

8. The method of claim 1, the plurality of image masks further comprising an extraneous object mask executed on a portion of the X-ray image depicting an object embedded within or affixed to the specimen tray.

9. The method of claim 8, wherein the boundary of the compartment mask and the boundary of the partial structure mask have different shapes compared to the boundary of the extraneous object mask, and a shape of the boundary of the compartment mask is different than a shape of the boundary of the partial structure mask as a result of executing the extraneous object mask.

10. The method of claim 9, wherein the boundary of the compartment mask includes a first linear boundary section, a second linear boundary section, a first arcuate boundary section, a second arcuate boundary section and a third arcuate boundary section, the first arcuate boundary section of the compartment mask extends between the first linear boundary section and the second linear boundary section, the second arcuate boundary section of the compartment mask extends between the first linear boundary section and the third arcuate boundary section, the third arcuate boundary section of the compartment mask extends between the second arcuate boundary section and the second linear boundary section, and a radius of curvature of the third arcuate boundary section of the compartment mask smaller than respective radii of curvature of respective first and second arcuate boundaries of the tissue specimen and partial structure masks.

11. The method of claim 8, wherein a portion of the boundary of the partial structure mask extends through an area defined by the boundary of the extraneous object mask.

12. The method of claim 8, wherein the object is a magnet utilized to rotate the specimen tray about an axis, a boundary of the extraneous object mask comprising a magnet mask substantially corresponds to an outer perimeter of the magnet depicted in the X-ray image, and the magnet mask substantially reduces at least one of a brightness and a contrast of pixels of the X-ray image depicting the magnet.

13. The method of claim 8, wherein the object is printed indicia associated with the storage compartment, and a boundary of the extraneous object mask comprising a printed indicia mask defines an area to be included in the modified image.

14. The method of claim 1, the plurality of image masks further comprising a pre-defined region of interest mask that is operable to crop the X-ray image to eliminate portions of the X-ray image depicting a collimator of the X-ray imaging system.

15. The method of claim 1, wherein the geometric configuration of at least the portion of the specimen tray depicted in the X-ray image is based at least in part on a center of a printed indicia associated with the storage compartment, further comprising rotating the X-ray image to align the center of the printed indicia with a pre-determined axis.

16. The method of claim 1, further comprising determining offset values of a collimator of the X-ray imaging system, wherein the geometric configuration of at least the portion of the specimen tray depicted in the X-ray image is based at least in part on the determined offset values.

17. The method of claim 1, wherein the plurality of image masks are executed in real time during processing of the tissue specimen.

18. The method of claim 1, further comprising modifying brightness values of pixels of the X-ray image to adapt respective brightness levels to respective thicknesses of the imaged tissue specimen.

19. The method of claim 1, wherein the partial structure mask leaves inner portions of the at least one of the plurality of walls within the modified x-ray image such that a thickness of the plurality of walls of the specimen tray is reduced within the modified x-ray image.

20. A biopsy tissue handling apparatus, comprising:

a specimen tray having a plurality of walls defining a storage compartment;

a tube defining a vacuum lumen in communication with the storage compartment, the tube being configured to receive a severed tissue specimen and deliver the severed tissue specimen with a fluid through the vacuum lumen so that the severed tissue specimen and the fluid are deposited into the storage compartment;

an X-ray imaging system arranged relative to the tissue storage compartment to acquire an X-ray image of the severed tissue specimen in the storage compartment;

an image processor in communication with the X-ray imaging system, the image processor being configured to:

generate a modified X-ray image by executing a plurality of image masks based at least in part on a geometric configuration of at least a portion of the specimen tray including the storage compartment with the severed tissue specimen depicted in the X-ray image, the plurality of image masks comprising:

a compartment mask executed on a portion of the X-ray image depicting the storage compartment including the severed tissue specimen, a boundary of the compartment mask substantially corresponding to a contour of an interior of the storage compartment defined by the plurality of walls of the specimen tray within the X-ray image, wherein the compartment mask enhances a portion of the X-ray image depicting the severed tissue specimen; and a partial structure mask executed on a portion of the X-ray image depicting respective walls of the storage compartment of the specimen tray, a boundary of the partial structure mask extending along respective lengths and partially through the respective walls of the storage compartment of the specimen tray within the X-ray image, wherein the partial structure mask masks or reduces a portion of the X-ray image depicting outer portions of at least one of the plurality of walls of the specimen tray, the outer portions of the at least one of the plurality of walls being masked or reduced are outside of the boundary of the partial structure mask, and wherein the boundary of the partial structure mask encompasses the boundary of the compartment mask; and a display, in communication with the image processor, the display being operable to present the modified X-ray image to the user of the biopsy tissue handling apparatus.

21. A non-transitory computer readable medium tangibly embodying one or more sequences of instructions wherein execution of the one or more sequences of instructions by one or more processors contained in one or more computing systems of a biopsy tissue handling apparatus causes the one or more computing systems to acquire and modify an X-ray image by executing a computer-implemented method comprising:

acquiring, by an X-ray imaging system of the biopsy tissue handling apparatus, an X-ray image of a tissue specimen in a storage compartment defined by a plurality of walls of a specimen tray;

generating, by an image processor in communication with the X-ray imaging system, a modified X-ray image, wherein the modified X-ray image is generated by executing a plurality of image masks based at least in part on a geometric configuration of at least a portion of the specimen tray including the storage compartment with the tissue specimen depicted in the X-ray image, the plurality of image masks comprising:

a compartment mask executed on a portion of the X-ray image depicting the storage compartment including the tissue specimen, a boundary of the compartment mask substantially corresponding to a contour of an interior of the storage compartment defined by the plurality of walls of the specimen tray within the X-ray image, wherein the compartment mask enhances a portion of the X-ray image depicting the tissue specimen; and a partial structure mask executed on a portion of the X-ray image depicting respective walls of the storage compartment of the specimen tray, a boundary of the partial structure mask extending along respective lengths and partially through the respective walls of the specimen tray within the X-ray image, wherein the partial structure mask masks or reduces a portion of the X-ray image depicting outer portions of at least one of the plurality of walls of the specimen tray, the outer portions of the at least one of the plurality of walls being masked or reduced are outside of the boundary of the partial structure mask, and wherein the boundary of the partial structure mask encompasses the boundary of the compartment mask.

\* \* \* \* \*